US012773595B2

(12) United States Patent
Zhai et al.

(10) Patent No.: US 12,773,595 B2
(45) Date of Patent: Oct. 27, 2026

(54) CARDIAC TREATMENT AND ANALYSIS

(71) Applicant: The Board of Regents of the Nevada System of Higher Education on Behalf of the University of Nevada, Las Vegas, NV (US)

(72) Inventors: Shengjie Zhai, Las Vegas, NV (US); Yingtao Jiang, Las Vegas, NV (US); Jian Ni, Las Vegas, NV (US)

(73) Assignee: The Board of Regents of the Nevada System of Higher Education on Behalf of the University of Navada, Las Vegas, NV (US)

( * ) Notice: Subject to any disclaimer, the term of this patent is extended or adjusted under 35 U.S.C. 154(b) by 168 days.

(21) Appl. No.: 18/621,630

(22) Filed: Mar. 29, 2024

(65) Prior Publication Data

US 2024/0325822 A1 Oct. 3, 2024

Related U.S. Application Data

(60) Provisional application No. 63/493,223, filed on Mar. 30, 2023.

(51) Int. Cl.
*A63B 24/00* (2006.01)
*A63B 71/06* (2006.01)
*G06N 3/0464* (2023.01)

(52) U.S. Cl.
CPC ...... *A63B 24/0075* (2013.01); *A63B 71/0622* (2013.01); *G06N 3/0464* (2023.01); *A63B 2071/0666* (2013.01); *A63B 2230/045* (2013.01)

(58) Field of Classification Search
CPC ............ A63B 24/0075; A63B 71/0622; A63B 2071/0666; A63B 2230/045; G06N 3/0464; A63F 2300/8082; A63F 13/212; A63F 13/245; A63F 13/25; A63F 13/67; A63F 13/816; A61B 5/0077; A61B 5/02405; A61B 5/0245; A61B 5/329; A61B 5/361;
(Continued)

(56) References Cited

U.S. PATENT DOCUMENTS 8,938,301 B2 * 1/2015 Hagedorn .............. A61B 5/291
607/45
10,860,103 B2 * 12/2020 Kacelenga .............. G06F 3/011
(Continued)

FOREIGN PATENT DOCUMENTS

KR 102113634 B1 * 5/2020 ............. G06T 13/80

*Primary Examiner* — Sundhara M Ganesan
(74) *Attorney, Agent, or Firm* — Ballard Spahr LLP

(57) ABSTRACT

Methods, systems, and apparatuses are described for cardia treatment and analysis. A computing device may cause a head mounted visual display worn by a patient to output visual imagery. The visual imager is configured to affect a psychological perception of the patient. The computing device may cause exercise equipment in use by the patient to affect a physical exercise performed by the patient. The computing device may measure, via one or more sensors, a cardiac exertion of the patient. The computing device may determine, based on the cardiac exertion of the patient, that the patient has not reached a maximum cardiac exertion. The computing device may adjust one or more of the visual imagery or the physical exercise. The adjustment may cause the patient to reach the maximum cardiac exertion.

20 Claims, 15 Drawing Sheets

(58) Field of Classification Search
CPC .... A61B 5/4884; A61B 5/7267; G16H 20/30; G16H 50/20
See application file for complete search history.

(56) References Cited

U.S. PATENT DOCUMENTS

| | | | | |
|---|---|---|---|---|
| 11,040,168 | B2 * | 6/2021 | Bender | G06F 3/011 |
| 11,311,220 | B1 * | 4/2022 | Al-Saggaf | A61B 5/165 |
| 2007/0219059 | A1 * | 9/2007 | Schwartz | A61B 5/329 482/8 |
| 2008/0214903 | A1 * | 9/2008 | Orbach | A61B 5/33 705/2 |
| 2009/0023554 | A1 * | 1/2009 | Shim | A63B 24/0084 482/4 |
| 2010/0002001 | A1 * | 1/2010 | Jerichow | A61B 5/411 348/51 |
| 2017/0273619 | A1 * | 9/2017 | Alvarado | A61B 5/681 |
| 2018/0154106 | A1 * | 6/2018 | Sánchez Vives | A61B 5/16 |
| 2018/0161626 | A1 * | 6/2018 | Fung | G09B 19/00 |
| 2019/0038180 | A1 * | 2/2019 | Tzvieli | G02B 7/002 |
| 2019/0046107 | A1 * | 2/2019 | Jang | A61B 5/486 |
| 2019/0160286 | A1 * | 5/2019 | Yang | A61N 1/36025 |
| 2019/0374148 | A1 * | 12/2019 | Cunnington | A61B 5/7445 |
| 2020/0183495 | A1 * | 6/2020 | Oh | A61B 5/742 |
| 2020/0390380 | A1 * | 12/2020 | Nie | A61B 5/18 |
| 2021/0046373 | A1 * | 2/2021 | Smith | A63B 71/0622 |
| 2021/0183477 | A1 * | 6/2021 | Rudich | A61B 5/16 |
| 2021/0259615 | A1 * | 8/2021 | Hendler | A61B 5/375 |
| 2021/0275094 | A1 * | 9/2021 | Wynne | G09B 19/00 |
| 2021/0295730 | A1 * | 9/2021 | Orozco | A61B 5/4884 |
| 2022/0327794 | A1 * | 10/2022 | Gates | G06F 3/013 |
| 2023/0320643 | A1 * | 10/2023 | Andreev | G06F 3/011 600/301 |
| 2024/0055138 | A1 * | 2/2024 | Sreenivasan | G16H 20/00 |
| 2024/0207682 | A1 * | 6/2024 | Matsimanis | A63B 24/0075 |
| 2025/0098964 | A1 * | 3/2025 | Schiller | A61B 5/4809 |

* cited by examiner

900

1200

| | | |
|---|---|---|
| **Train. set.** | **Values of** $N_{pat,i}$ | (1,0,0), (0,1,0), and (0,0,1) |
| | **Values of** $L_{SNR,i}$ | -27, -18, -12, -10, -9, -8, -7, -6, -5, -4, -3, -2, -1, 0, 1, 2, 3, 6, 9, and 12 |
| | **Probability** $P_{x_i}(N_{pat,i}, L_{SNR,i})$ | $P_{x_i}(N_{pat,i}, L_{SNR,i}) = \frac{1}{60}$ |

1210

| | | | | | | | |
|---|---|---|---|---|---|---|---|
| **Test. set. 1.1** | **Values of** $L_{SNR,i}$ | 3 | 6 | 9 | 12 | | |
| | **Probability** $P_{x_i}(L_{SNR,i})$ | 0.033 | 0.9 | 0.033 | 0.033 | | |
| **Test. set. 1.2** | **Values of** $L_{SNR,i}$ | -9 | -4 | -3 | -2 | 3 | |
| | **Probability** $P_{x_i}(L_{SNR,i})$ | 0.05 | 0.3 | 0.3 | 0.3 | 0.05 | |
| **Test. set. 1.3** | **Values of** $L_{SNR,i}$ | -4 | -3 | -2 | 3 | 6 | |
| | **Probability** $P_{x_i}(L_{SNR,i})$ | 0.2 | 0.2 | 0.2 | 0.1 | 0.3 | |
| **Test. set. 1.4** | **Values of** $L_{SNR,i}$ | -27 | -18 | -12 | | | |
| | **Probability** $P_{x_i}(L_{SNR,i})$ | 0.6 | 0.3 | 0.1 | | | |
| **Test. set. 1.5** | **Values of** $L_{SNR,i}$ | -27 | -18 | -12 | -8 | -5 | -3 |
| | **Probability** $P_{x_i}(L_{SNR,i})$ | 0.6 | 0.05 | 0.05 | 0.05 | 0.05 | 0.2 |
| Noise pattern $N_{pat,i}$ has 3 outcomes, namely {(1,0,0), (0,1,0), (0,0,1)}, and $P_{x_i}(N_{pat,i}) = \frac{1}{3}$. | | | | | | | |

1220

| | **Values of** $N_{pat,i}$ | **Values of** $L_{SNR,i}$ | **Probability** $P_{x_i}(N_{pat,i}, L_{SNR,i})$ | **Outcomes of** $R_i$ |
|---|---|---|---|---|
| **Test. set. 2.1** | (0.8,0.1,0.1), (0.1,0.8,0.1), (0.1,0.1,0.8), and (0.33,0.33,0.33) | -27, -18, -9, -4, -2, 2, 3, 6, 9, 12, and clean | $P_{x_i}(L_{SNR,i} = \text{clean}) = \frac{1}{44}$ $P_{x_i}(N_{pat,i}, L_{SNR,i}) = \frac{1}{44}$ | **AF** |
| **Test. set. 2.2** | | | | **I-AVB** |
| **Test. set. 2.3** | | | | LBBB |
| **Test. set. 2.4** | | | | PAC |
| **Test. set. 2.5** | | | | PVC |
| **Test. set. 2.6** | | | | RBBB |
| **Test. set. 2.7** | | | | STD |
| **Test. set. 2.8** | | | | STE |
| 1025 ECG signals are included in each experiment. | | | | |

FIG. 12

CARDIAC TREATMENT AND ANALYSIS

CROSS-REFERENCE TO RELATED APPLICATIONS

This application claims priority to U.S. Provisional Patent Application No. 63/493,223, filed Mar. 30, 2023, the entire contents of which are hereby incorporated herein by reference into this application.

BACKGROUND

Cardiovascular diseases are the leading cause of death globally. Of an estimated 17.9 million deaths each year, half of cardiovascular deaths are related to sudden cardiac arrest, which has symptoms of severe arrhythmic events as well as myocardial ischemia and infarction. Early detection of cardiac arrhythmic events and myocardial ischemia is thus critical to timely intervention.

SUMMARY

Methods, apparatuses, and systems are described for cardiac treatment and analysis. For example, a computing device may cause a head mounted visual display worn by a patient to output visual imagery. The visual imagery may be configured to affect a psychological perception of the patient. The computing device may cause exercise equipment in use by the patient to affect a physical exercise performed by the patient. The computing device may measure, via one or more sensors, a cardiac exertion of the patient. The computing device may determine, based on the cardiac exertion of the patient, that the patient has not reached a maximum cardiac exertion. The computing device may adjust one or more of the visual imagery or the physical exercise. The adjustment may cause the patient to reach the maximum cardiac exertion.

BRIEF DESCRIPTION OF THE DRAWINGS

In order to provide an understanding for the techniques described, the figures provide non-limiting examples in accordance with one or more implementations of the present disclosure, in which:

FIG. 12 illustrates an example training and testing data in accordance with one or more implementations of the present disclosure.

DETAILED DESCRIPTION

Figure 1:
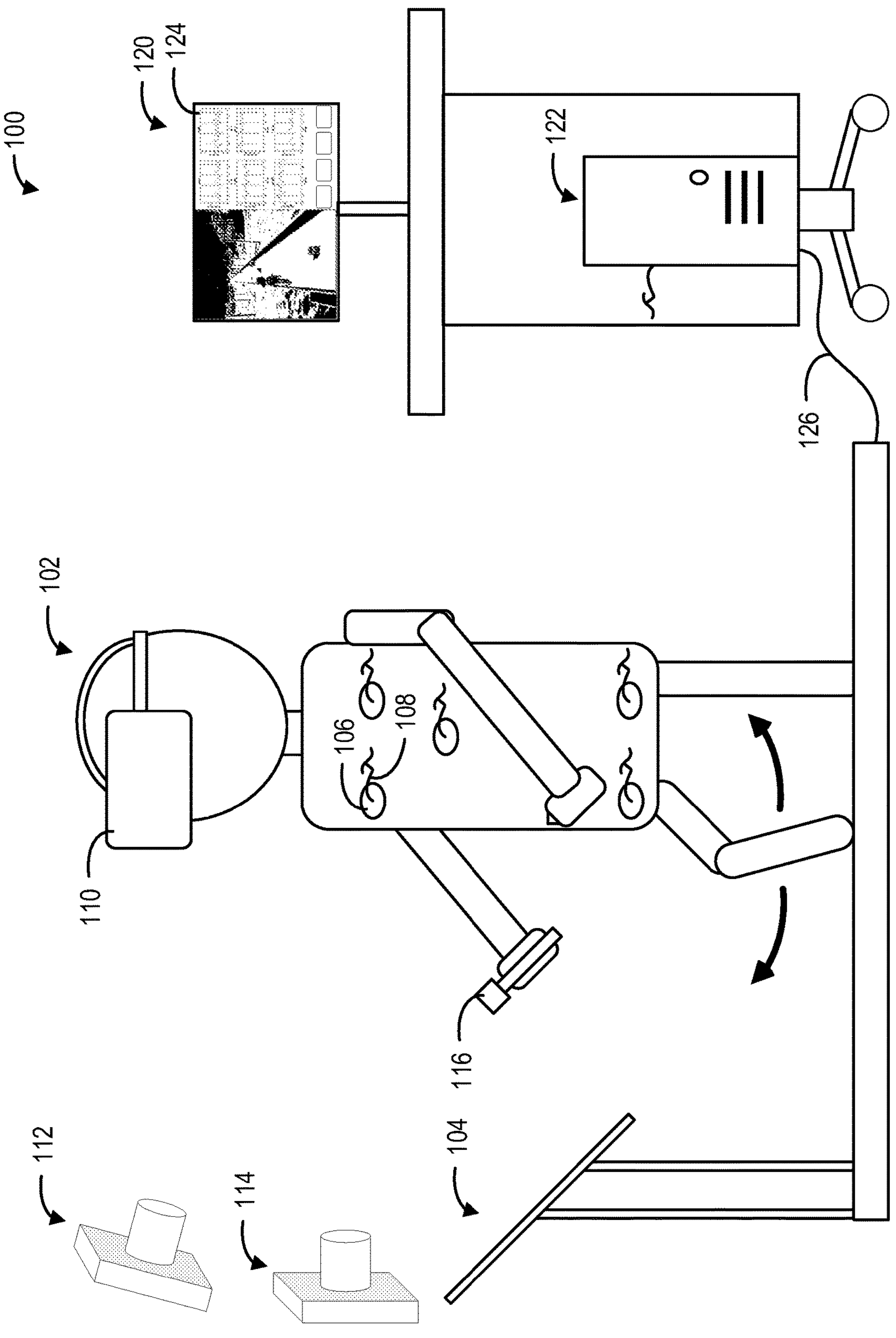
FIG. 1 illustrates an example system, or portion thereof, in accordance with one or more implementations of the present disclosure.

As used in the specification and the appended claims, the singular forms "a," "an," and "the" include plural references unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a computer (e.g., a special purpose computer), or other programmable data processing apparatus to produce a machine, such that the processor-executable instructions which execute on the computer or other programmable data processing apparatus create a device for implementing the functions specified in the flowchart block or blocks.

This detailed description may refer to a given entity performing some action. It should be understood that this language may in some cases mean that a system (e.g., a computer) owned and/or controlled by the given entity is actually performing the action.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a special purpose computer or other programmable data processing instrument to produce a machine, such that the processor-executable instructions which execute on the computer or other programmable data processing instrument create a device for implementing the steps specified in the flowchart block or blocks.

These processor-executable instructions may also be stored in a non-transitory computer-readable memory or a computer-readable medium that may direct a computer or other programmable data processing instrument to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing instrument to cause a series of operational steps to be performed on the computer or other programmable instrument to produce a computer-implemented process such that the processor-executable instructions that execute on the computer or other programmable instrument provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hard ware and computer instructions.

Cardiovascular diseases can result from the condition where circulatory vessels that supply oxygenated blood to the heart become gradually narrowed. As described herein, a stress test may be used to measure the response of the cardiovascular system to external or internal stressors. The stress test may be based on factors. For example, the factors may be related to physical stress, psychological stress, or combinations thereof. For example, the cardiac exertion of the patient may be controlled or changed through physical stress caused by muscular operation and motion. The characteristics of muscular operation and motion may either increase the cardiac exertion or decrease the cardiac exertion. For example, the speed of a treadmill may increase muscular operation and motion of the patient, which can increase the cardiac exertion of the patient. The magnitude of increase may be calculated or predicted based on the patient (e.g., weight, height, age).

The cardiac exertion of the patient may be controlled or changed through psychological stress. For example, a psychological perception of the patient may be adjusted through the patent's senses to alter the cardiac exertion of the patient. The perception may include a visual perception. For example, the patient may be exposed to images or video to adjust psychological stress. A combination of the physical and psychological stress may allow practitioners to dial-in adequate cardiac exertion of the patient and ensure that treatment is properly ordered based on the underlying conditions therein.

Stress tests, and patient movement, may impart noise or other abnormalities in a signal, or data, used to determine cardiac exertion, cardiovascular disease, or other indications related to the patient. Denoising such signals, or data, may reduce the underlying indication. This reduction may challenge categorization of the signal, or data, further along in the analysis and treatment pipeline. For example, removal of noise from a signal based on the patient may reduce the quality of the signal and increase the likelihood of miscategorization, which may increase the misdiagnosis or treatment. The quality of the signal may be quantified as a signal-to-noise ratio or other features of the input. A network (e.g., a neural network) may be configured to predict the likelihood that another network (e.g., a portion of the neural network or another neural network) can properly classify the signal or data. This separate classification may prevent erroneous classification and reduce workloads on computing resources, thereby improving efficiency and operation of computers.

A network may also be used to determine whether the signal, or data, should be cleaned, directly analyzed, or discarded. For example, the network may be trained to determine whether the signal can be denoised without substantially reducing the quality of the underlying signal, or data, indicative of cardiovascular health (e.g., electrocardiogram). The quality of the signal may be quantified as a signal-to-noise ratio or other features of the input. For example, the substantial reduction may be considered a reduction where the underlying signal indicative of cardiovascular health is uncategorizable by a network. That is, the network configured to determine whether the signal, or data, should be cleaned, directly analyzed, or discarded may be trained to recognize signals that are predicted to be cleaned and only alter the signal, or data, by a predetermined percentage or quantity. The network configured to determine whether the signal, or data, should be cleaned, directly analyzed, or discarded may be trained to determine whether the signal, or data, may be more likely to be unrecognizable or incorrectly categorized. For example, the network may be configured to determine a confidence factor or interval of whether the signal, or data, may be more likely to be unrecognizable or incorrectly categorized and removed from the analysis or processed differently.

The signal, or data, may be categorized or classified as abnormal.

Abnormal rhythms may include Atrial fibrillation (AF), First-degree atrioventricular block (I-AVB), Left bundle branch block (LBBB), Right bundle branch block (RBBB), Premature atrial contraction (PAC), Premature ventricular contraction (PVC), ST-segment depression (STD), and ST-segment elevation (STE).

In FIG. 1, an example system 100, or portion thereof, in accordance with one or more implementations of the present disclosure, is shown. The system 100 may interact with one or more patient 102, one or more practitioner, or a combination thereof. For example, the system 100 may include equipment 104. For example, the equipment 104 may be exercise equipment (e.g., a treadmill, bike, stair stepper, weights, bands, etc.). That is, the equipment 104 may be operable to affect a physical exercise performed by the patient 102. The exercise may be one or more of running, walking, biking, weight lifting, or performing exercises. For example, the physical exercise may include a physical movement of the patient 102. The physical movement of the patient 102 may be the movement of an appendage (e.g., an arm, a leg).

The exercise, equipment 104, movement, or combination thereof may be associated with factors. For example, the factors may affect the physical exercise performed. The factors may cause the physical exercise performed to be more challenging to the cardiovascular system of the patient 102, the factors may cause the physical exercise performed to be less challenging to the cardiovascular system, or the factors may cause the movements of the patient to change without having a measurable effect on the cardiovascular system (e.g., change the appendage engaged in the exercise). For example, the factor may be speed, or relate to the speed, of the equipment (e.g., speed of the tread), the resistance, or relate to the resistance, of the equipment (e.g., incline of the tread).

Sensors 106 may be affixed to the patient 102 during the exercise to provide an indication of cardiac exertion. For example, the sensors 106 may provide the indication through leads 108. The leads 108 may be attached to a computing system 120. The leads 108 may conduct electrical signals (e.g., an electrocardiogram signal) for conversion into data by the computing system 120 through an analog to digital converter (not shown).

The system 100 may include equipment 110. The equipment 110 may be worn by the patient 102 or the interface may be located in the same room as the patient 102. The equipment 110 may include an interface. For example, the interface may be configured to affect a psychological perception of the patient 102. The interface may include a display, speakers, tactile interaction, smells, tastes, or other impacts to the senses or psychological perceptions of the patient 102. A psychological perception may be a perception by the patient 102 that relates to mental, emotional, or sensory faculties. A factor may be used to affect the psychological perception of the patient 102. For example, a particular visual, sound, taste, smell, touch, or combination thereof may be configured to elicit the perception by the patient 102. The visual may be an image or video. One or more factors may be used. For example, video may be combined with sound to immerse the patient 102 and cause the psychological perception.

The interface may include a controller 116. The controller may provide tactile feedback to the patient 102 and provide the patient 102 with an interactive experience. For example, the interactive experience may include a game. The game may generate a virtual reality for the patient 102. The virtual reality may include a virtual environment. The virtual environment may be synchronized with equipment 104. For example, the speed of the equipment 104 (e.g., speed of a treadmill) may be matched with the speed that the environment changes.

The controller 116 may allow the patient 102 to interact with objectives in the game and enable interactive play. Cameras 112, 114 (e.g., visible, infrared) may enable tracking of the patient during exercise. For example, the tracking may further map patient motion to the virtual reality environment (e.g., the environment provided on the interface). Positional information may be included on the controllers 116 or other sensors (e.g., sensors 106) to provide relative movements of body parts or appendages and display those movements in the environment.

The equipment 104, 110 may be connected with a computing system 120 through wired (e.g., wire 126) or wireless communications. The computing system 120 may execute instructions on a computer 122. The computer 122 may also be a controller of the equipment 104, 110 and the display 124. The computer 122 may include one or more processors, memory, computer-readable media, or combinations thereof. The computing system 120 may include a display 124 for providing a visual indication of the virtual reality and cardiac indications from the patient 102.

Figure 2:
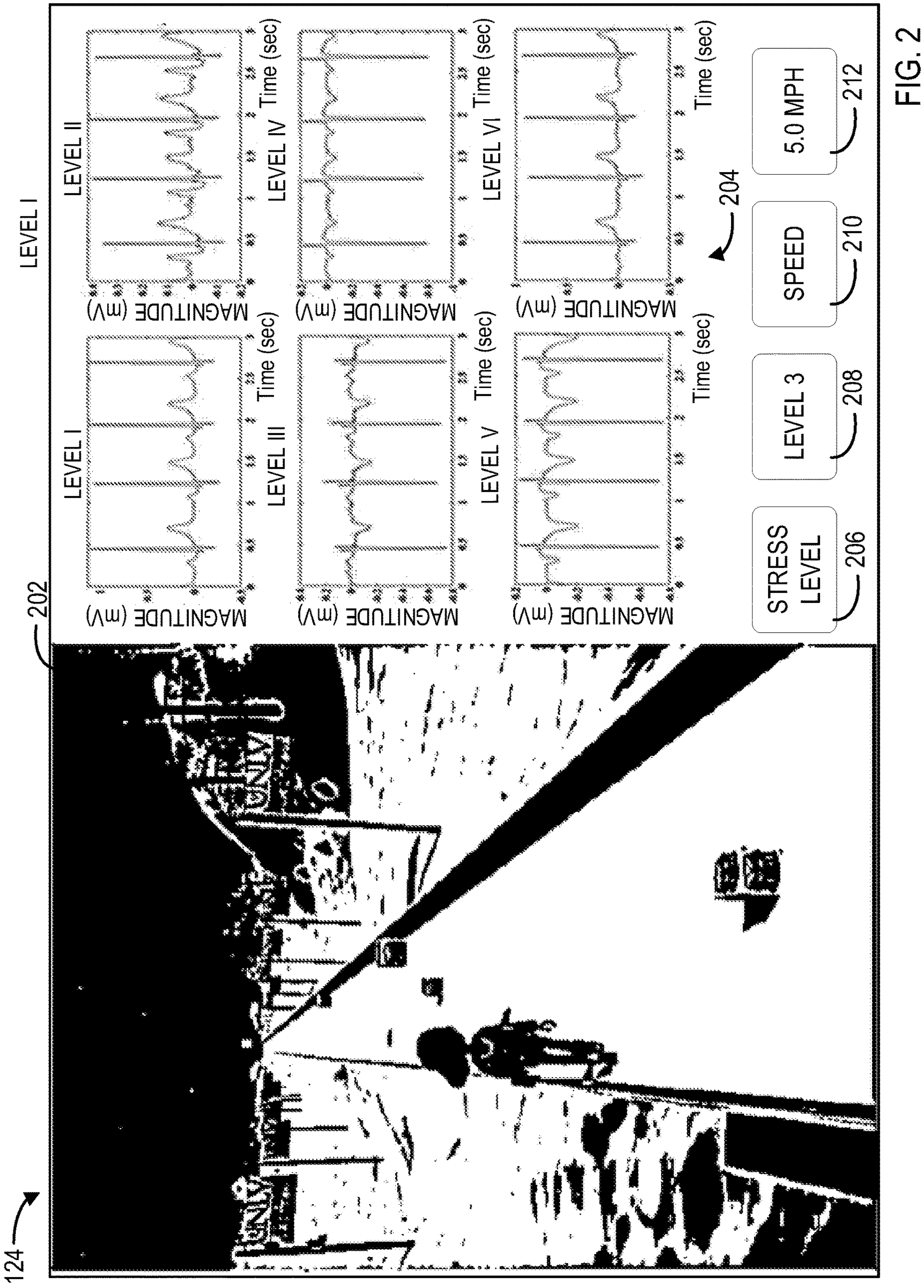
FIG. 2 illustrates an example display in accordance with one or more implementations of the present disclosure.

For example, in FIG. 2, an example display 124 in accordance with one or more implementations of the present disclosure is shown. The display 124 may include a depiction of a virtual environment 202. The depiction of the virtual environment 202 may be displayed along with electrocardiogram signals 204. The electrocardiogram signals 204 may be digital or analog. For example, a converter (e.g., an analog to digital converter) may be included with the computing system 120 to convert the analog voltages, or currents, from the leads 108 to electrocardiogram signals 204, or data.

The display 124 may include indicators or controls 206, 208, 210, 212. For example, a stress level indicator 206 may determine a cardiac exertion indication 208. The cardiac exertion may be determined based on various factors. For example, demographic information (e.g., age), physical information (e.g., heart rate, heart rate variability, weight, blood pressure, etc.), other information, or combinations thereof may be used to determine the cardiac exertion indication 208. For example, the cardiac exertion may be categorized or quantified and displayed as the cardiac exertion indication 208. The display 124 may further provide a parameter indication 210 (e.g., speed) associated with the equipment 104. The factor indication 210 may be associated with a factor of equipment 104, 110 or a combination thereof.

Figure 3:
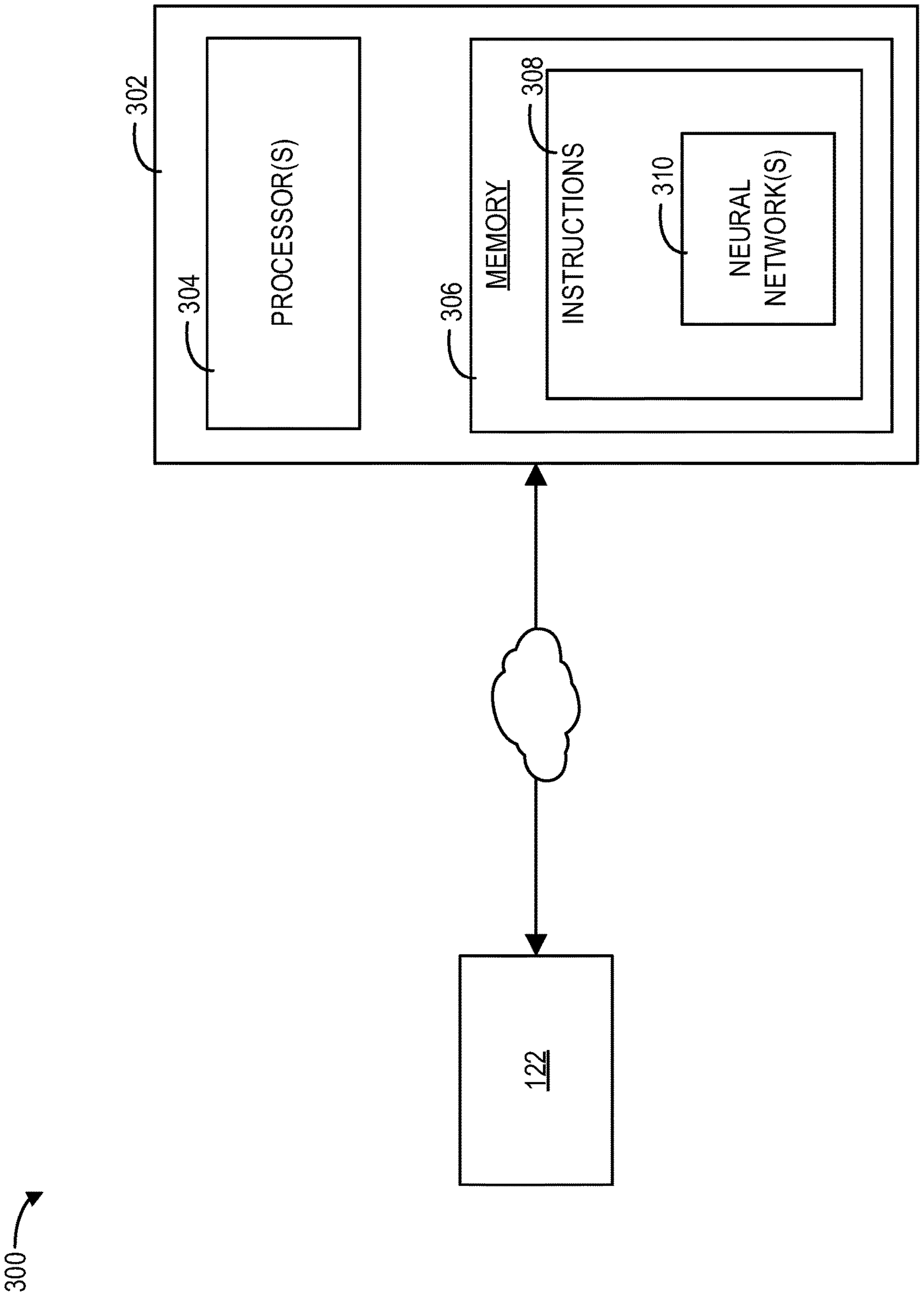
FIG. 3 illustrates an example system, or portion thereof, in accordance with one or more implementations of the present disclosure.

In FIG. 3, an example system 300, or portion thereof, is shown in accordance with one or more implementations of the present disclosure. For example, the computer 122, or another portion of the computing system 120, may be networked with cloud computing 302 or other computing systems. Although shown as distinct components, the computer 122 and the cloud computing 302 may interchangeably use the same components, instructions, neural networks, or combinations thereof. For example, cloud computing may provide increased processing or memory capabilities on demand and accessible by the computer 122. As computing technology progresses, cloud computing 302 or local computing by computer 122 may be unnecessary.

Cloud computing may include containers, virtual machines, processors 304, non-transitory memory 306, or combinations thereof to provide additional computing resources to computer 122. For example, the non-transitory memory 306 may include instructions 308. The instructions 308 may be defined in different languages (e.g., machine code, assembly, C, PYTHON). The instructions 308 may be configured to define or train one or more neural networks. For example, the neural networks may be defined by layers, nodes, interconnections, weights, biases, or combinations thereof. For example, the neural networks may be defined by instructions that define the layers or nodes and stored weights to adjust inputs and result in desired outputs (e.g., classifications, categorizations).

Figure 4:
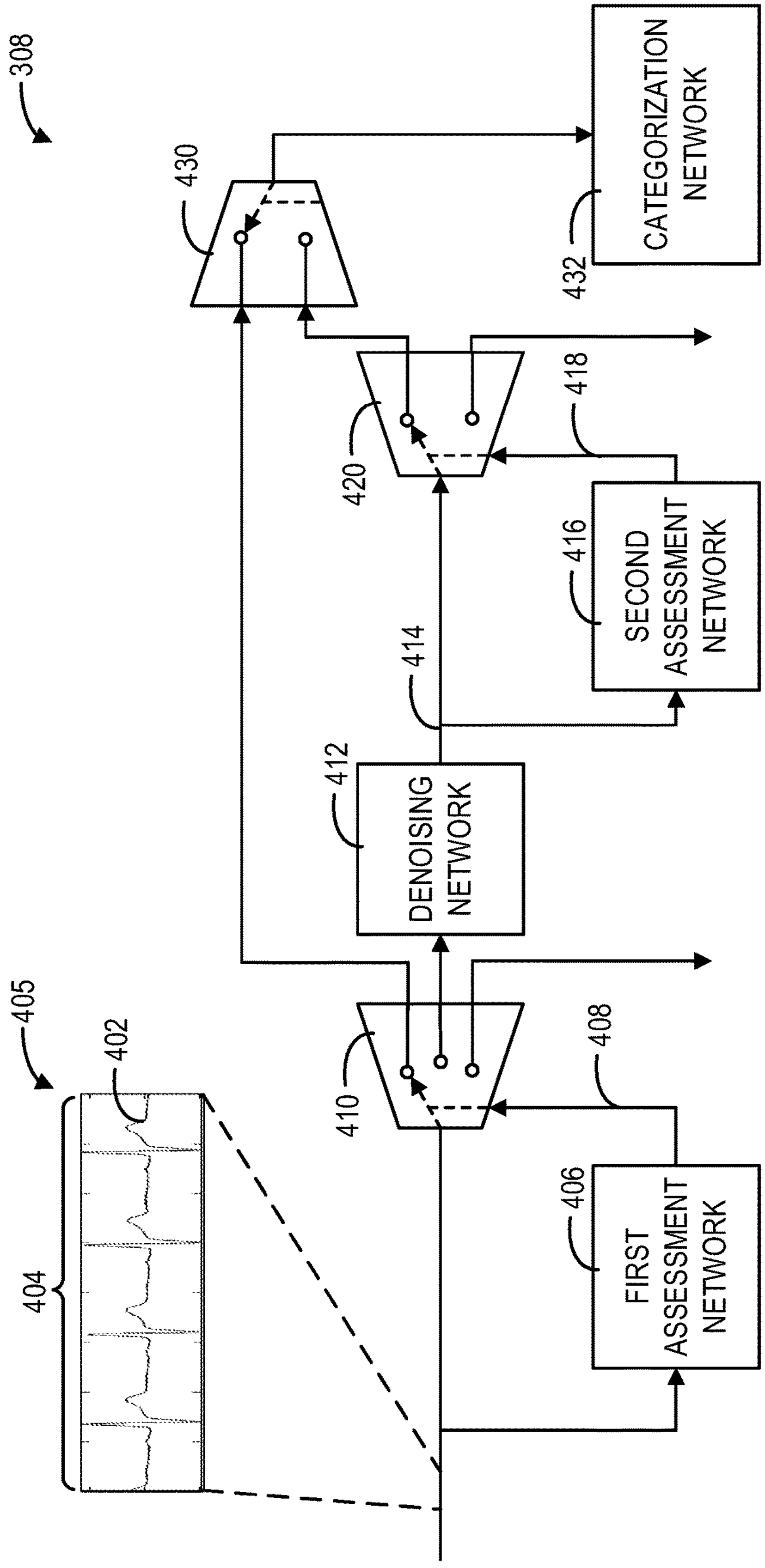
FIG. 4 illustrates an example method in accordance with one or more implementations of the present disclosure.

Referring to FIG. 4, an example instructions 308 in accordance with one or more implementations of the present disclosure is shown. The instructions 308 may be conducted by the computer 122, the cloud computing 302, other processing, or combination thereof. The method may include receiving data (e.g., data 405). The data may be in the form of a signal or representative of the signal (e.g., an electrocardiogram 402). The data may be based on a segment (e.g., time window) of the electrocardiogram signal. For example, the segment may be based on 30-seconds of the electrocardiogram signal. The data (e.g., data 405) may be analyzed by a neural network 406. For example, the neural network 406 may classify the data to determine whether the data is distorted and determine whether the distortion should be reduced or whether the sample should be discarded altogether. That is, instructions 410 may be configured to discard the data (e.g., data 405) or pass the data onto one or more other neural networks (e.g., denoising network 412, categorization network 432). The network 406 may be used to classify the signal into classifications based on a signal-to-noise ratio. For example, a first class may include the electrocardiogram signals that have a signal-to-noise value of greater than zero dB value, which would not require distortion or noise reduction. A second class may include the electrocardiogram signals that have a signal-to-noise value of between negative six and zero dB value, which would allow for noise or distortion reduction with network 412. A third class may include the electrocardiogram signals that have a signal-to-noise value less than negative six dB, which would be discarded or removed from further processing.

The denoising network 412 may reduce distortion imparted in the electrocardiogram signal as it is collected. Distortion may be caused by various sources (e.g., movement, conversion, sensitivity, etc.). Through denoising, the data (e.g., data 405) is converted to denoised or clean data (e.g., data 414). The data (e.g., data 414) may represent a clean electrocardiogram signal or an electrocardiogram signal with reduced distortion.

The data (e.g., data 414) may be classified again to determine whether the data (e.g., data 414) can be classified into the correct category. For example, a network (e.g., neural network 416) may be used to evaluate the data 414 to determine whether another neural network could correctly categorize the data after denoising, reducing false positives, or negatives, categorized by the categorization network 432. Based on the classification by network (e.g., neural network 416), instructions 420 may send the data (e.g., data 414) to the categorization network 432 or discard the data. The categorization network 432 may categorize the electrocardiogram signal, or data (e.g., data 405, data 414), into one or more categories (e.g., Atrial fibrillation (AF), First-degree atrioventricular block (I-AVB), Left bundle branch block (LBBB), Right bundle branch block (RBBB), Premature atrial contraction (PAC), Premature ventricular contraction (PVC), ST-segment depression (STD), ST-segment elevation (STE), normal sinus rhythms). Other abnormalities may be detected.

Figure 5:
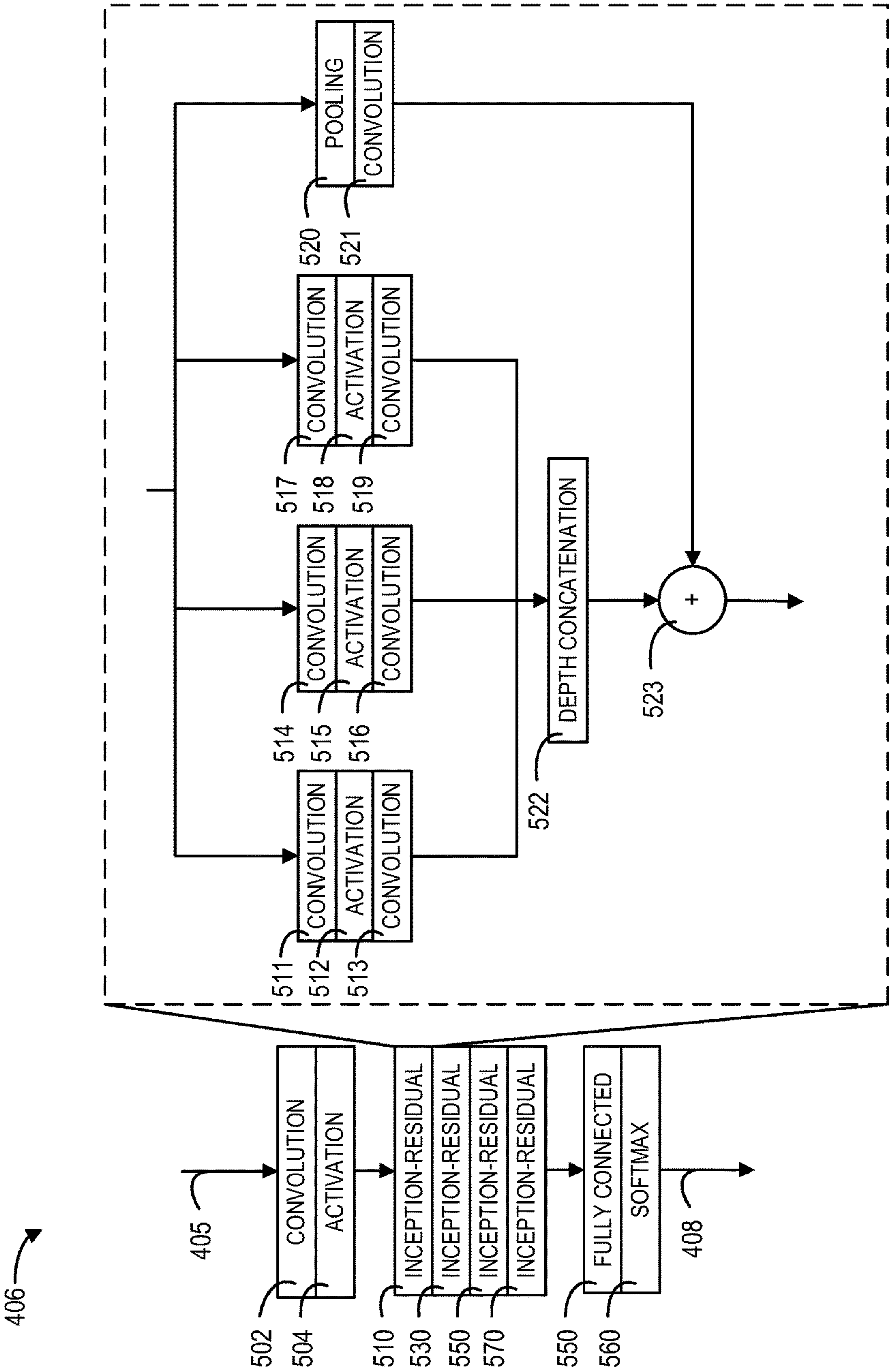
FIG. 5 illustrates an example network in accordance with one or more implementations of the present disclosure.

In FIG. 5, an example network (e.g., network 406, network 416, network 432) in accordance with one or more implementations of the present disclosure is shown. The example network may be trained, implemented, or executed on one or more computing device described herein (e.g., computer 122, cloud computing 302). The network (e.g., network 406, network 416, network 432) may include instructions 308 depicted as layers (e.g., layers 502, 504) and weights. The input data (e.g., data 405) may have a size of N×1×C, where N is the length of the segment 404 (e.g., 30 seconds) and C is the number of channels of the segment. For example, the input may be 15000×1×1. The convolutional layer 502 (e.g., convolutional neural network (CNN)) may have a kernel size of [16×1] and 32 convolutional filters with a stride of two, resulting in an output of the convolutional layer 502 with dimensions 15000×1×32. The activation layer 504 may activate the results of the convolutional layer 502 and may include a batch normalization layer. The inception-residual layers 510, 530, 550, 570 may comprises similar layers to that depicted for inception-residual layer 510.

For example, the inception-residual layer 510 may include parallel convolutional layers 511, 514, 517, activation layers 512, 515, 518, and additional convolutional layers 513, 516, 519. The convolutional layers 511, 514, 517 may have the same, or similar, kernel size, convolutional filters, and stride of convolutional layer 502 (e.g., [3 1]×32, stride of two). The activation layers 512, 515, 518 may be hyperbolic tangent (tanh) activation functions similar to activation layer 504. Convolutional layers 513, 516, 519 may have a kernel size of [3 1], 16 convolutional filters, and a stride of two. The inception-residual layer 510 may include a depth concatenation 522 (e.g., channel-dimension concatenation, stacking) of the output from convolutional layers 513, 516, 519. For example, the outputs from convolutional layers 513, 516, 519 may be used as a stacked channel inputs (e.g., adding or stacking the third dimensions of each output together) as inputs for the next inception-residual layer (e.g., inception-residual layer 530). The inception-residual layer may include a pooling layer 520 (e.g., a down-sampling layer, max pooling layer) and a convolutional layer 521. The output of convolutional layer 521 may be added to the depth concatenation 522 for input to the next inception-residual layer (e.g., inception-residual layer 530) or the fully connected layer 550. Dropout (e.g., random omission of results) may be used before sending the results to the fully connected layer 550. After the fully connected layer, a softmax may be used to classify the output on a set scale (e.g., zero to one).

The output of network 408 may be a confidence interval for whether the data (e.g., data 405) should be discarded, denoised with the denoising network 412, or sent to the categorization network 432. For example, data (e.g., data 405) may be received by the network 406, and the network 406 may output a result comprising a confidence score for discarding the data (e.g., 15%), denoising the data (e.g., 60%), and categorizing the data (e.g., 25%). As such, the date (e.g., data 405) may be classified as a segment (e.g., segment 404) that can be denoised without substantially reducing the quality of the underlying signal, or data, indicative of cardiovascular health (e.g., electrocardiogram). For example, the substantial reduction may be considered a reduction where the underlying signal indicative of cardiovascular health is uncategorizable by a network. That is, the network configured to determine whether the signal, or data, should be cleaned, directly analyzed, or discarded may be trained to recognize signals that are predicted to be cleaned and only alter the signal, or data, by a predetermined percentage or quantity. The substantial reduction may be further based on whether another network (e.g., network 416) would classify, or would be predicted to classify, the data (e.g., data 414 based on data 405) as likely be correctly categorized by the categorization network 432.

Figure 6:
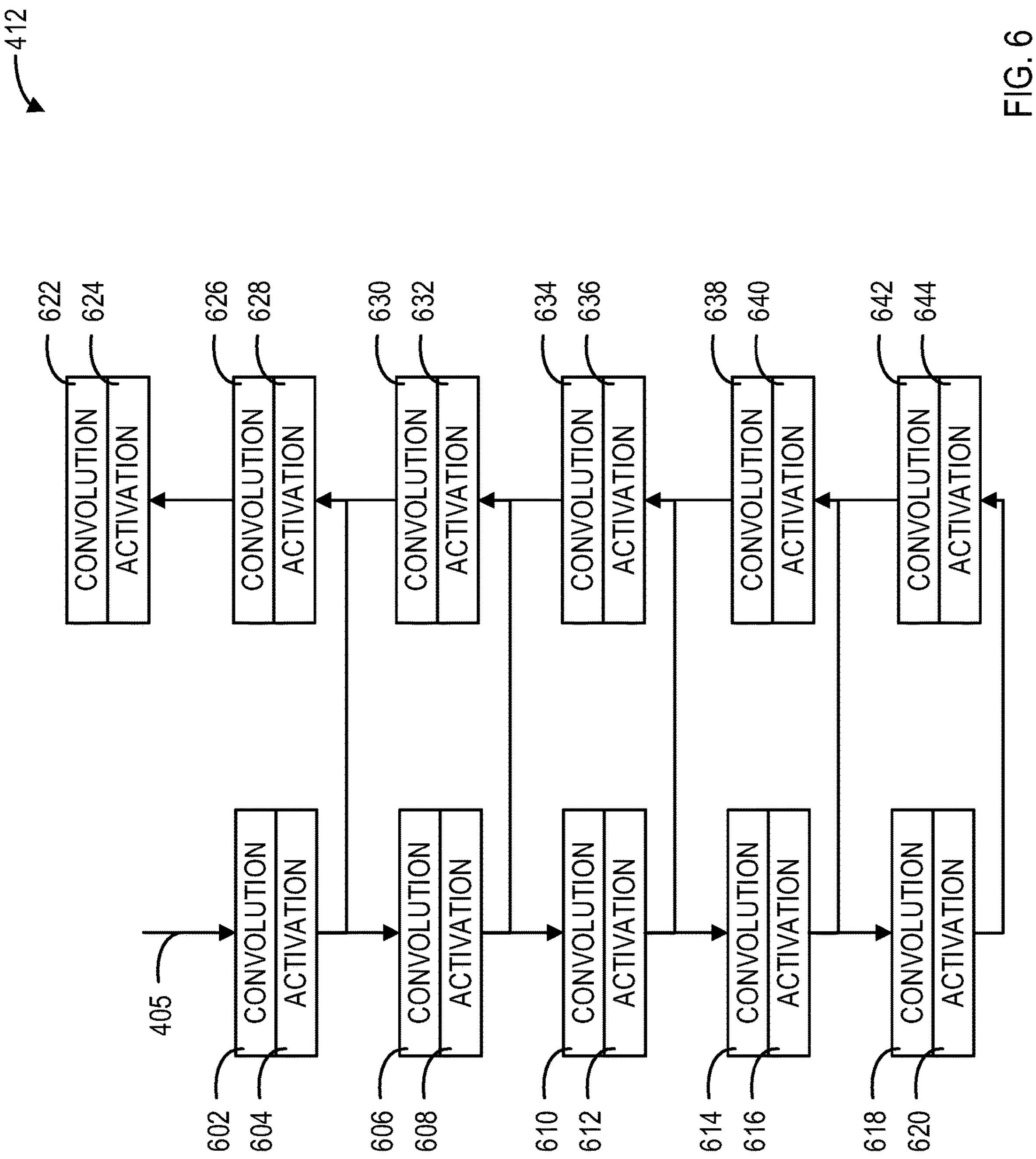
FIG. 6 illustrates an example network in accordance with one or more implementations of the present disclosure.

In FIG. 6, an example network 412 in accordance with one or more implementations of the present disclosure is shown. The example network 412 may be trained, implemented, or executed on one or more computing device described herein (e.g., computer 122, cloud computing 302, etc.). The network 412 may include instructions 308 depicted as layers (e.g., layers 602, 604) and weights. The example network 412 may be based on a U-Net configuration. The network 412 may be an encoder-decoder network. For example, layers 602, 604, 606, 608, 610, 612, 614, 616, 618, 620 may encode the data (e.g., data 405) and layers 622, 624, 626, 628, 630, 632, 634, 636, 638, 640, 642, 644 may decode the encoded data, reducing distortion present in the data, or underlying signal. For instance, convolutional layers 602, 606, 610, 614, 618 may encode the data along with activation layers 604, 608, 612, 616, 620 (e.g., tanh) and deconvolutional layers 622, 626, 630, 634, 638, 642 may decode the data along with activation layers 624, 628, 632, 636, 640, 644 (e.g., tanh).

Figure 7:
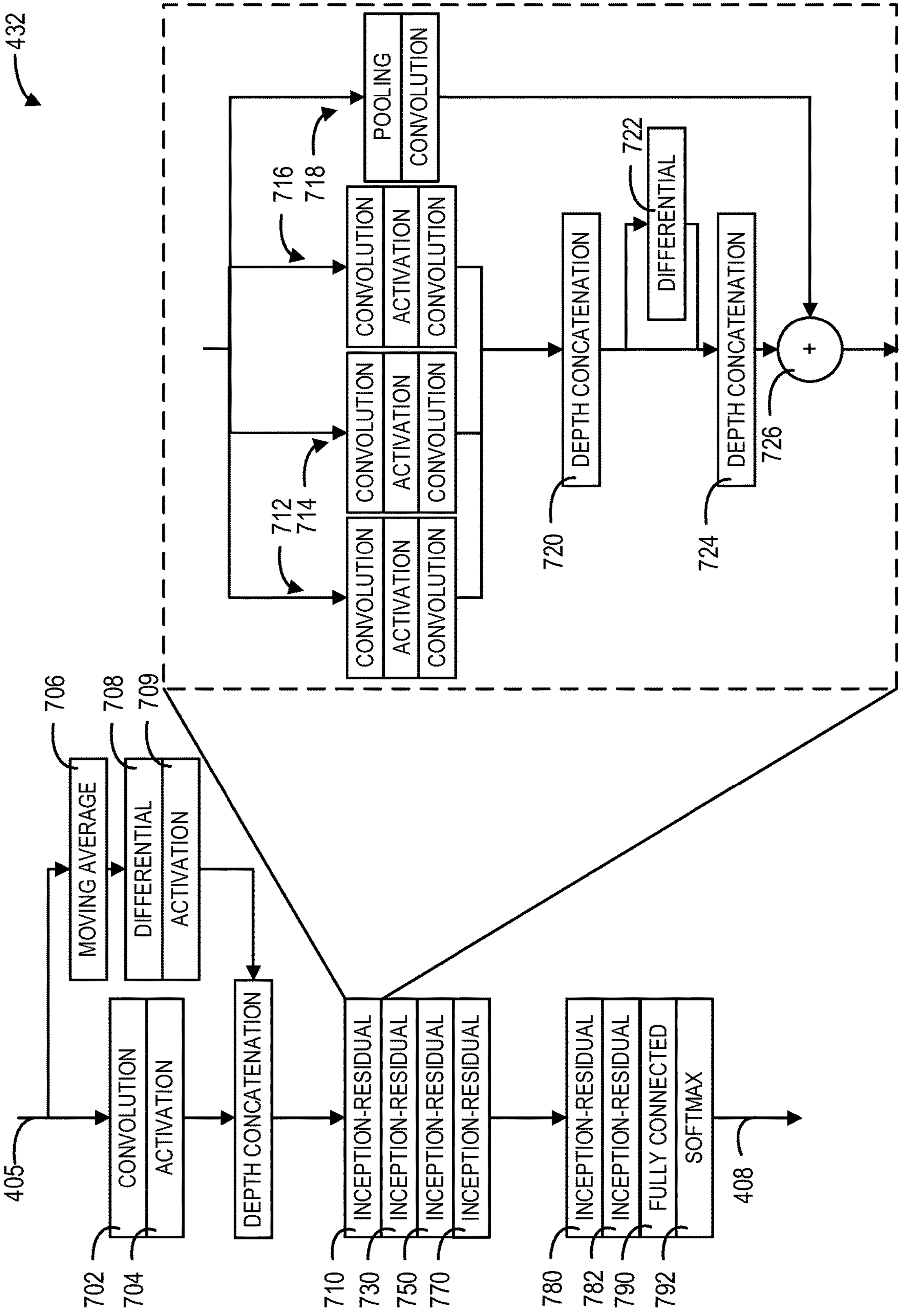
FIG. 7 illustrates an example network in accordance with one or more implementations of the present disclosure.

In FIG. 7, an example network (e.g., network 406, network 416, network 432, etc.) in accordance with one or more implementations of the present disclosure is shown. The example network may be trained, implemented, or executed on one or more computing device described herein (e.g., computer 122, cloud computing 302, etc.). The network (e.g., network 406, network 416, network 432, etc.) may include instructions 308 depicted as layers (e.g., layers 702, 704) and weights. The network 432 may comprise a convolutional layer 702 and an activation layer 704. A moving average (e.g., mean value of the electrocardiogram) over a window (e.g., previous 0.2 seconds of segment 404) may be determined in layer 706. That is, for each data point over time, the value may be replaced by a mean of the previous 0.2 seconds of the segment 404. The adjusted 30-second segment having the averaged windows may be used as an input to a differential layer 708 and activation layer 709. The differential layer 708 may be based on or defined by Equations 1 and 2.

$$z = f(x) \Rightarrow z = \frac{dz}{dx} \tag{1}$$

$$\frac{\mathrm{dL}}{dx} = \frac{\mathrm{dL}}{dz} * \frac{dz}{dx} \Rightarrow \frac{\mathrm{dL}}{dx} = \frac{\mathrm{dL}}{dz} * \frac{d^2z}{dx^2} \tag{2}$$

where for the forward pass, x is the input (e.g., adjusted 30-second segment with averaged windows over each 0.2 window) to the differential layer 708 and z is the output (e.g., feature map outputted to the subsequent layer). For the backward pass, "is the backpropagated loss from the depth concatenation 705 and" is the calculated loss to backpropagate and dz/dx is the local gradient. It should be appreciated that the activation layers 704, 709 may include different activation functions (e.g., tanh, Rectifier Linear Unit (ReLU)).

The activated differential layer 708 may be depth concatenated with the activated convolutional layer 702 in depth concatenation layer 705. After the depth concatenation layer 705, inception-residual layers 710, 730, 750, 770 may be used to further extract features in the pipeline. The inception-residual layers 710, 730, 750, 770 may be similar to inception-residual layers 510, 530, 550, 570. For example, the inception-residual layers 710, 730, 750, 770 may include similar convolution-activation-convolution layers 712, 714, 716 and pooling-convolution layers 718. The convolution-activation-convolution layers 712, 714, 716 may be depth concatenated in depth concatenation layer 720. A differential layer 722 may be used to further extract features from the depth concatenation layer 720 and those features may be further depth concatenated in depth concatenation layer 724. The depth concatenation layer 724 may be combined with the pooling-convolution layers 718 in summation block 726 and provided to layers 780, 782 (e.g., long short-term memory (LSTM)). Layers 780, 782 may adjust the output from a temporal aspect. Layers 780, 782 may output to fully connected layer 790 and softmax 792, indicating whether the data (e.g., data 405) is categorized as having an abnormal condition (e.g., first-degree atrioventricular block (I-AVB), left bundle branch block (LBBB), right bundle branch block (RBBB), premature atrial contraction (PAC), premature ventricular contraction (PVC), ST-segment depression (STD), or ST-segment elevation (STE)). For example, data (e.g., data 405) may be categorized by an indicated confidence percentage that the data is one or more of the categories (e.g., 75% certain that the data is indicative of a left bundle branch block).

Figure 8:
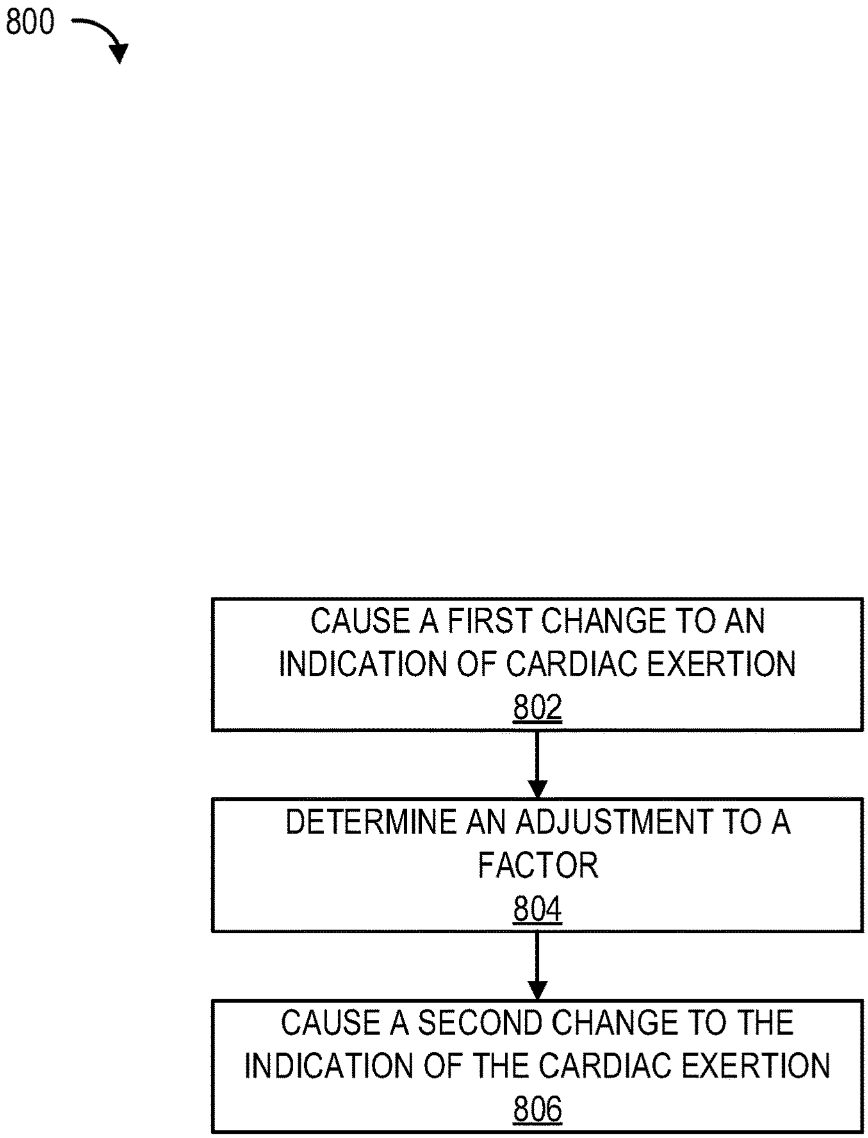
FIG. 8 illustrates an example method in accordance with one or more implementations of the present disclosure.

In FIG. 8, an example method 800 in accordance with one or more implementations of the present disclosure is shown. The one or more of the steps of method 800 may be implemented or executed on one or more computing device described herein (e.g., computer 122, cloud computing 302, etc.). The method may be executed as instructions 308.

For example, the method 800 may cause a first change to an indication of cardiac exertion of a patient in step 802. The first change to the indication of cardiac exertion may be an initial change (e.g., an initialization of the indication) or a change to the indication during a procedure or exercise. The first change may be based on one or more factor. For example, the change may be based on a factor configured to affect a psychological perception of the patient. The psychological perception may be orchestrated by equipment 110. For example, the patient may be exposed to a psychological stimulus. The psychological stimulus may affect various sensory inputs of the patient 102.

In an example, the first change may be based on a first factor configured to affect a psychological perception of the patent. Alternatively or additionally, the first change may be based on a second factor configured to affect a physical exercise performed by the patient. The first factor may comprise a psychological stimulus. The first change may be caused by exposing the patient to the psychological stimulus. For example, the first factor may comprise a visual component. The visual component may comprise an image of an environment. The environment may be based on the physical exercise. The environment may be categorized as one known to cause an emotional response. The emotional response may be defined relative to an emotional baseline of the patient. The environment may be categorized as one known to cause the emotional response by the patient. The visual component may also comprise an image of a mental task. The mental task may be arithmetic.

In step 804, an adjustment to one or more of the first factor or the second factor may be determined. For example, the adjustment may be based on the indication of cardiac exertion of the patient. A magnitude of the first factor may be selected. For example, the magnitude of the first factor may be selected based on the adjustment. The magnitude of the first change to the indication of the cardiac exertion of the patient may be dependent on the magnitude of the first factor. The magnitude of the second factor may be selected. The magnitude of the second factor may be based on the magnitude of the first factor and the adjustment. The difficulty level of the first factor may be based on the first factor. The difficulty level of the first factor may be skewed based on the patient.

The magnitude of the second factor may be based on the adjustment. The magnitude of the first change to the indication of the cardiac exertion of the patient may be dependent on the magnitude of the second factor. The magnitude of the first factor may be based on the magnitude of the second factor and the adjustment. The magnitude of the first factor may be selected based on the adjustment. The magnitude of the first change to the indication of the cardiac exertion of the patient may be dependent on the magnitude of the first factor.

The magnitude may be based on an intensity, difficulty, speed, color, volume, other settings impacting the factor, or a combination thereof. For example, the magnitude may control the speed of a rollercoaster video shown to the patient 102. The magnitude may control the coloration of images shown to the patient 102. The magnitude may be used to affect the change by a particular amount or be based on an initial baseline. The magnitude of the factor may be based on the other factor. For example, the magnitude of a factor related to the psychological perception may be based on a magnitude of a factor related to the physical exercise. The magnitude of a factor related to the physical exercise may be based on a magnitude of a factor related to the psychological perception. For example, the magnitude of a factor related to the physical exercise may be dependent on the factor related to the psychological perception. As the magnitude of a factor related to the physical exercise goes up, the factor related to the psychological perception may be increased or decreased (e.g., proportionally).

The adjustment to one or more of the first factor or the second factor may be determined based on a target indication of cardiac exertion. For example, the target indication of cardiac exertion may support an assessment or treatment of the patient 102. The target may be a heart rate or heart rate variability. For example, the indication of cardiac exertion, historical information related to the patient 102, other information, or a combination thereof may be used to determine the adjustment. The adjustment may be incremental. For example, the adjustment may be designed to increase or decrease the indication of cardiac exertion by a predetermined increment or a magnitude or intensity of the adjustment may be predetermined. For example, an increase is heart rate of a predetermined quantity of beats per minute may be correlated with a magnitude of the factor. For instance, the patient 102 may have a heart rate of 60 beats per minute. A determination may be made by a computer (e.g., computer 122) that proper analysis and treatment of the patient requires 70 beats per minute.

The method 800 may cause a second change to the indication of cardiac exertion of the patient in step 806. The second change may be based on the adjustment. A correlation between the first factor (e.g., difficulty of game played) and the second factor (e.g., speed of the treadmill) may be used to determine the second change to the indication of cardiac exertion of the patient. For example, the correlation may predict that the adjustment to one or more of the factors may increase the indication by 70 beats per minute. After causing change based on the adjustment, the indication may have only increase by 5 beats per minute. As such, another adjustment may be made intended to increase the heart rate to 70 beats per minute. The second adjustment may include the correlation and the actual results. For example, an adjustment to the second factor may be based on the first factor or an adjustment to the first factor or vice versa. The factor may be associated with a difficulty of a task. For example, the psychological perception may be associated with a game, and the factor may be associated with a difficulty of the game. The difficulty may be defined numerically (e.g., levels) or empirically. For example, the difficulty may be skewed based on the patient 102. The difficulty may be scaled based on information related to the patient (e.g., age, weight, medical conditions, etc.).

The difficulty, or factor, may be related to a visual component. The visual component may be categorized as being associated with causing fear, excitement, or another emotional response (e.g., rollercoaster, rock climbing, birth of a child, etc.). The visual component may be related to the physical exercise or the equipment 104. The patient 102 may be assigned an emotional baseline and a regression may be formed relative to the emotional baseline after being shown different visual components. For example, a change in the indication may be perceived after showing the patient 102 visual components, or other sensory implements, configured to affect a psychological perception of the patient 102. The regression may be used to further predict expected changes from the adjustment. For example, patient 102, or plurality of patients, may be shown different images to form an understanding of expected psychological perception of the patient 102 and resulting changes to the indication.

In such a way, the adjustment may be predicted or associated with an expected outcome. Patients may be shown visual components, or other components, from a corpus of visual components specifically curated for the patient 102 or a group of patients that the patient is associated with by information related to the patient (e.g., age, weight, medical conditions, etc.). The visual component may include images of mental tasks (e.g., reading, arithmetic, etc.). For example, the adjustment(s) may be based on any of the neural networks described herein or other neural networks.

The patient may be treated based on the indication of cardiac exertion, the first factor, and/or the second factor. The treatment may comprise one or more of coronary angioplasty, thrombolytic therapy, coronary artery bypass surgery, an artificial pacemaker, heart valve surgery, defibrillation, an exercise regimen, or an administration of medication. The cardiac exertion may be based on one or more of an electrocardiogram, a heart rate, or a blood pressure. Data may be sent to a repository based on the cardiac exertion of the patient. For example, the data may be sent based on a cardiac exertion limit.

Figure 9:
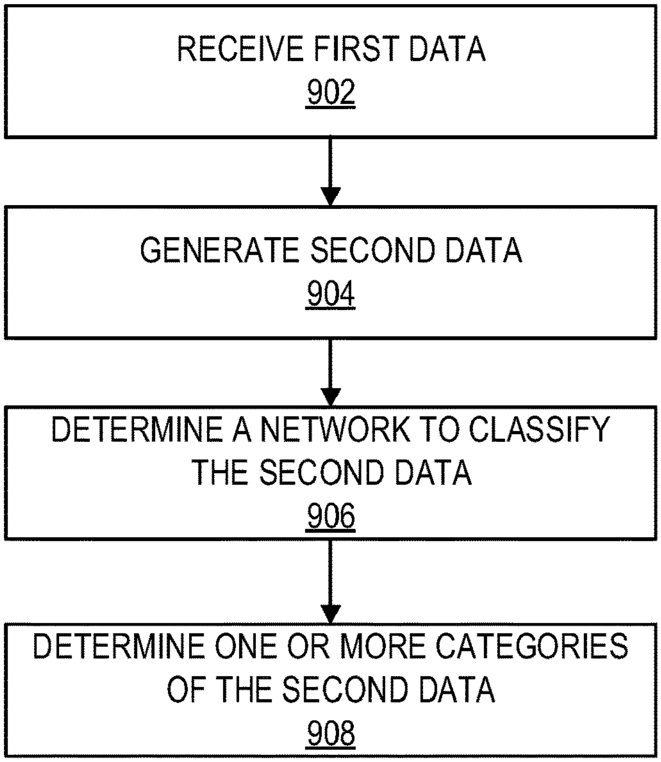
FIG. 9 illustrates an example method in accordance with one or more implementations of the present disclosure.

In FIG. 9, an example method 900 in accordance with one or more implementations of the present disclosure is shown. The method 900 may include the diagnosis and treatment of a patient (e.g., patient 102). One or more implements may diagnose or treat the patient. For example, an electrocardiogram (e.g., electrocardiogram 402) of the patient may be taken during cardiac exertion in one or more of the examples provided herein. For example, the treatment may comprise one or more of coronary angioplasty, thrombolytic therapy, coronary artery bypass surgery, an artificial pacemaker, heart valve surgery, defibrillation, an exercise regimen, or an administration of medication.

In step 902, first data may be received. The first data may be based on an electrocardiogram (ECG) signal (e.g., electrocardiogram 402) or another signal. For example, the first data may be based on a segment of an electrocardiogram signal (e.g., electrocardiogram 402). An average of the segment may be generated based on a window of the segment. The ECG signal may be converted with an analog to digital converter. It is contemplated that one or more of the neural networks 406, 412, 416, 432 described herein may be implemented as circuitry and applied to analog signals. It is also contemplated that one or more of the neural networks 406, 412, 416, 432 described herein may be implemented as instructions on a computer (e.g., computer 122) and applied to digital signals. The ECG (e.g., electrocardiogram 402) signal may include distortion. For example, the ECG signal may include distortion that originates from movement of the patient 102, conversion from analog to digital, a connection between leads 108 and the patient, other sources, or a combination thereof.

In step 904, second data may be generated (e.g., data 414). The second data may be generated by a first neural network (e.g., network 412). The second data may be based on an electrocardiogram (e.g., electrocardiogram 402). The generated data may reduce the distortion contained therein. For example, the second data may be generated by reducing the distortion. The distortion may be reduced based on a signal-to-noise ration associated with the ECG signal according to the first neural network. For example, the first neural network (e.g., network 412) may be trained on data that is based on electrocardiogram signals with distortion and signals without distortion. Distortion may be added to the data artificially or based on examples of distortion imparted during stress tests. The data may be encoded and then decoded, and compared with data without distortion to train the first neural network (e.g., network 412) to remove distortion. As such, distortion may be removed from the second data (e.g., data 405) by a network and result in data 414). The first neural network may comprise an encoder-decoder network.

In step 906, a neural network to classify the second data (e.g., data 414) may be determined. For example, a third neural network (e.g., network 432) that is to classify the second data may be determined based on the second data and a second neural network (e.g., network 416). The second neural network may be configured to determine the third neural network has a higher likelihood to classify the second data to be categorized in a correct category than the second neural network. The second data (e.g., data 414) may be classified into those where the underlying electrocardiogram signal can be recovered and those where the electrocardiogram signal is unrecoverable. In such a way, the second neural network (e.g., network 416) may classify data (e.g., data 414) into those that can be accurately categorized by a categorization network (e.g., the third neural network or network 432) into electrocardiogram morphologies, abnormalities, typical, or normal as described herein (e.g., normal, atrial fibrillation, etc.) and those that cannot (e.g., unrecoverable after distortion is reduced or removed). In such a way, the quantity of incorrect categorizations by data having reduced distortion can be minimized, reducing the incorrect treatment of patients 102. This analysis may also improve the efficiency of analysis, reducing unnecessary processing and analysis of signals. The second neural network may comprise an inception-residual layer.

It should be appreciated that the method 900 may also include classifying data according to another neural network (e.g., a fourth neural network or network 406) as described herein. For example, the first data that include the distortion and a greater likelihood to be cleaned without a substantial reduction in a quality of the ECG signal than to be cleaned with the substantial reduction of the ECG signal may be determined based on the first data and the fourth network (e.g., network 406). The fourth neural network (e.g., network 406) may classify the first data (e.g., data 405) between having distortion and not having distortion, and the fourth neural network (e.g., network 406) may classify the data (e.g., data 405) between those having distortion that is worth removing and not worth removing. That is, the first data (e.g., data 405) that can be reduced without a loss of the underlying electrocardiogram signal so that it can be accurately categorized. For example, the network 406 may be trained to predict which sets of data (e.g., data 405) include distortion and cleaned without a substantial reduction in a quality of the electrocardiogram signal than to be cleaned with the substantial reduction of the electrocardiogram signal. For example, network 406 may be trained on examples of clean electrocardiogram data, lightly distorted electrocardiogram data, and heavily distorted electrocardiogram data. The training data may be categorized and curated. For example, the training data may be analyzed to see which data is correctly categorized by a categorization network (e.g., categorization network 432). The fourth neural network may comprise an inception-residual layer. The inception-residual layer may comprise a depth concatenation of convolutional layers.

In step 908, one or more of the second data may be determined. For example, one or more categories of the second data may be determined based on the second data and the third neural network (e.g., network 432). The second data may comprise an abnormal cardiac condition. The third neural network (e.g., network 432) may categorize data without distortion or classified as not having distortion (e.g., data 405) and the third neural network may categorize data with reduced or removed distortion (e.g., data 414). The categorization may include categories such as normal and abnormal or the categorization may be more specific, indicating the abnormality therein (e.g., atrial fibrillation, first-degree atrioventricular block, left bundle branch block, right bundle branch block, premature atrial contraction, premature ventricular contraction, ST-segment depression, or ST-segment elevation, or other categories.

Treatment may performed on the patient 102. The treatment may include at least one of coronary angioplasty, thrombolytic therapy, coronary artery bypass surgery, an artificial pacemaker, heart valve surgery, defibrillation, an exercise regimen, or an administration of medication. The treatment may be performed based on the categorization by network 432 or another indication of a treatable ailment.

The ECG signal described in FIG. 9 may be generated based on multiple steps. For example, a head mounted visual display worn by a patient may be caused to output visual imagery. The visual imagery may be configured to affect a psychological perception of the patient. Exercise equipment in use by the patient may be caused to affect a physical exercise performed by the patient. A cardiac exertion of the patient may be measured via one or more sensors. Based on the cardiac exertion of the patient, it may be determined that the patient has not reached a maximum cardiac exertion. One or more of the visual imagery or the physical exercise may be adjusted. The adjustment may cause the patient to reach the maximum cardiac exertion.

Figure 10:
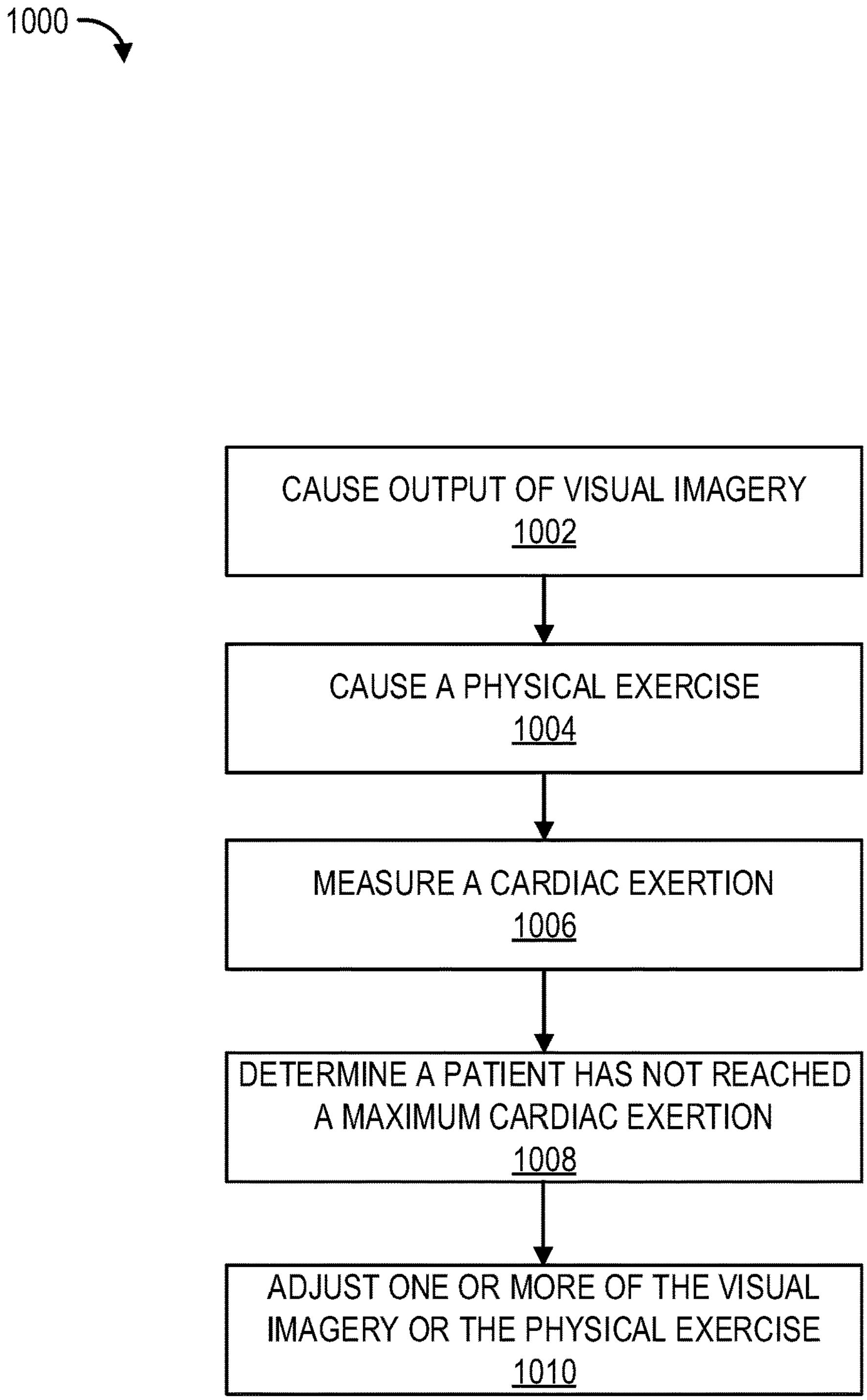
FIG. 10 illustrates an example method in accordance with one or more implementations of the present disclosure.

In FIG. 10, an example method 1000 in accordance with one or more implementations of the present disclosure is shown. The one or more of the steps of method 1000 may be implemented or executed on one or more computing devices described herein (e.g., computer 122, cloud computing 302, etc.). The method may be executed as instructions 308.

In step 1002, a head mount visual display (e.g., equipment 110) may be caused to output visual imagery. The head mount visual display (e.g., equipment 110) may be worn by a patient. The visual imagery may be configured to affect a psychological perception of the patient. The head mount visual display may include an interface. For example, the interface may be configured to affect a psychological perception of the patient. The interface may include visual imagery. A psychological perception may be a perception by the patient 102 that relates to mental, emotional, or sensory faculties.

In step 1004, exercise equipment (e.g., equipment 104) may be caused to affect a physical exercise performed by the patient. For example, the exercise equipment may be a treadmill, bike, stair stepper, weights, bands, or the like. The exercise equipment may be operable to affect a physical exercise performed by the patient. The physical exercise may be one or more of running, walking, biking, weight lifting, or performing exercises. For example, the physical exercise may include a physical movement of the patient. The physical movement of the patient may be the movement of an appendage (e.g., an arm, a leg)

In step 1006, a cardiac exertion of the patient may be measured. For example, the cardiac exertion of the patient may be measured via one or more sensors (e.g., sensors 106). The one or more sensors may be affixed to the patient during the exercise to measure an indication of cardiac exertion. For example, the one or more sensors may provide the indication of cardiac exertion through leads (e.g., leads 108) to a computing device (e.g., computer 122). The leads may be attached to the computing device. The leads may conduct electrical signals (e.g., an ECG signal) for conversion into data by the computing device through an analog to digital converter. The one or more sensors may be one or more ECG sensors.

In step 1008, the patient not reached a maximum cardiac exertion may be determined. For example, based on the cardiac exertion of the patient, it may be determined that the patient has not reached the maximum cardia exertion. In step 1010, one or more of the visual imager or the physical exercise may be adjusted. For example, adjusting the one or more of the visual imager or the physical exercise may comprise increasing or decreasing an intensity level of the physical exercise. Alternatively or additionally, adjusting the one or more of the visual imager or the physical exercise may comprise increasing or decreasing a stress level of the visual imagery. The adjustment may be determined based on regression analysis between the intensity level of the physical exercise and the stress level of the visual imager. The adjustment may cause the patient to reach the maximum cardiac exertion. For example, the computing device may determine, based on the adjustment, that the patient reached the maximum cardiac exertion. Based on that the patient reached the maximum cardiac exertion, the computing device may determine physiological data of the patient. For example, the computing device may record physiological data of the patent when the patient reached the maximum cardiac exertion.

The physiological data may be divided into one or more segments. Each of the one or more segments may comprise a plurality of electrocardiogram (ECG) bits and a plurality of noise components associated with the plurality of ECG bits. One or more noise components associated with the plurality of ECG bits may be reduced. Based on the plurality of ECG bits and a machine learning model, one or more cardiac anomalies may be determined. The machine learning model may be configured to determine, based on the plurality of ECG bits, one or more abnormal rhythms associated with the one or more cardiac anomalies. The one or more cardiac anomalies may comprise one or more of atrial fibrillation, first-degree atrioventricular block (I-AVB), left bundle branch block (LBBB), right bundle branch block (RBBB), premature atrial contraction (PAC), premature ventricular contraction (PVC), ST-segment depression (STD), or ST-segment elevation (STE). The one or more cardiac anomalies may comprise one or more of atrial fibrillation, first-degree atrioventricular block (I-AVB), left bundle branch block (LBBB), right bundle branch block (RBBB), premature atrial contraction (PAC), premature ventricular contraction (PVC), ST-segment depression (STD), or ST-segment elevation (STE).

Figure 11:
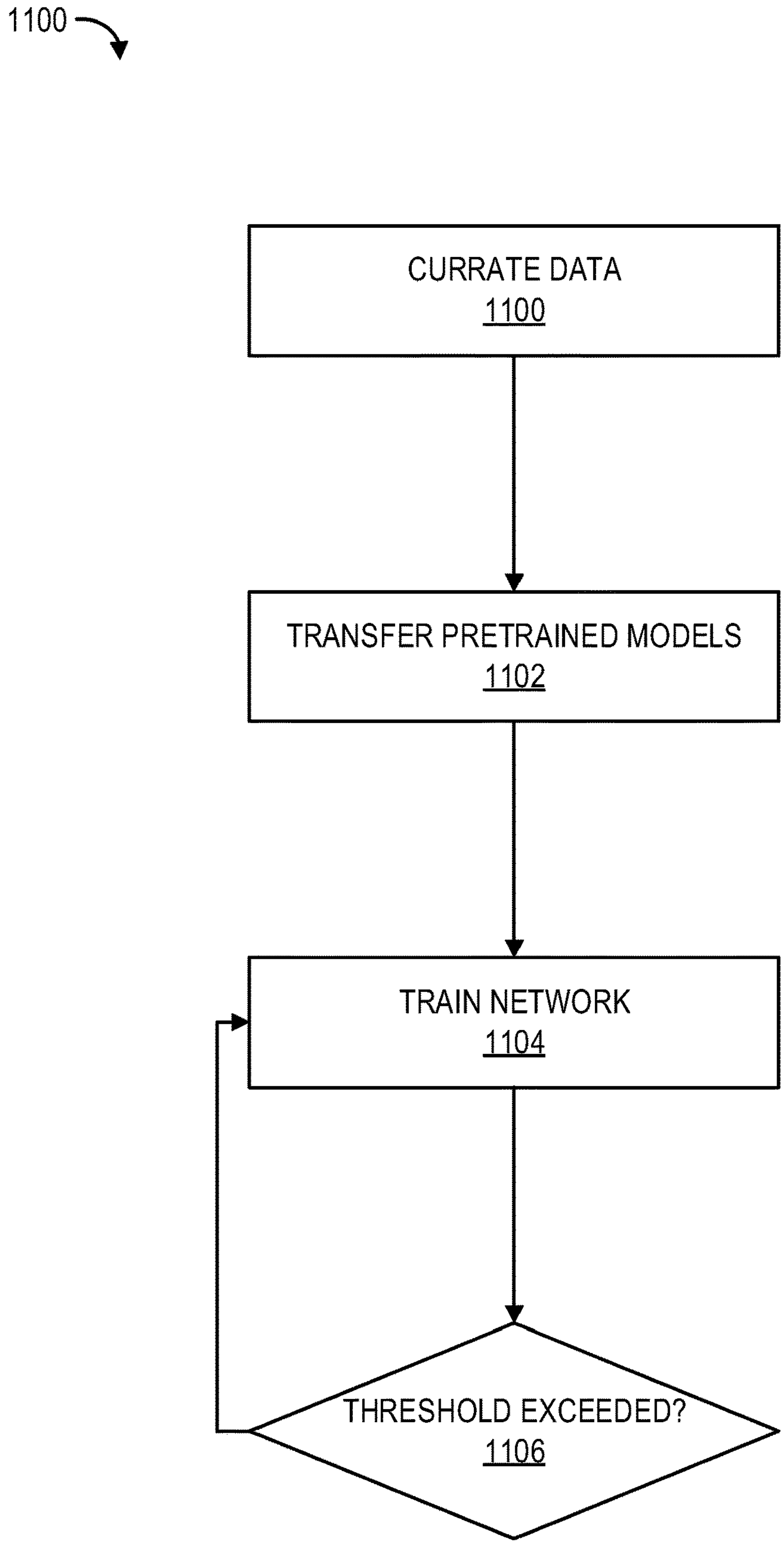
FIG. 11 illustrates an example method in accordance with one or more implementations of the present disclosure.

In FIGS. 11 and 12, an example method 1100 and test data 1200, 1210, 1220 in accordance with one or more implementations of the present disclosure is shown. The method 1100 may be implemented or executed on one or more computing device described herein (e.g., computer 122, cloud computing 302). The method may be executed as instructions 308. The method 1000 may be used to train a network (e.g., network 406, network 412, network 416, network 432).

In step 1102, data may be curated to train a network (e.g., network 406, network 412, network 416, network 432, etc.). For example, network 416 may be trained based on electrocardiogram recordings categorized as clean or noise-free. These electrocardiogram recordings may be divided into two groups. The groups may have a 7:3 ratio. The two groups may then be corrupted with the forms of noise (e.g., baseline wandering, electrode motion, muscle artifacts, etc.) to provide the distorted electrocardiogram data or signals needed for training and testing. For example, a 12-lead distorted electrocardiogram signal x(t), $t_0 \le t \le t_0+30$ (where $t_0$ is a particular time) may be used to denote the signal on the i-th channel as $x_i(t)$. A Fourier transform of $x_i(t)$, denoted as $X_i(f)$, is shown in Equation 3.

$$X_i(f) = X_{ECG,i}(f) + k_i * N_i(f) \tag{3}$$

$$k_i = \frac{1}{\sqrt{10^{\frac{L_{SNR,i}}{10}} * \frac{P_{noi,i}}{P_{ECG,i}}}} \tag{4}$$

where $X_{ECG,i}(f)$ is the Fourier transform of the clean electrocardiogram signal on the i-th channel, denoted as $X_{ECG,i}(t)$, $N_i(f)$ is the Fourier transform of the noise on the i-th channel, denoted as $N_i(t)$, $L_{SNR,i}$ is the signal-to-noise ratio of $x_i(t)$, $P_{ECG,i}$ is the power of $X_{ECG,i}(f)$, and $P_{noi,i}$ is the power of $N_i(t)$. $P_{noi,i}$ is given as:

$$P_{noi,i} = a_1 \times P_{bw,i} + a_2 \times P_{em,i} + a_3 \times P_{ma,i} \tag{5}$$

where $a_1$, $a_2$, $a_3$ are the respective percentages of baseline wandering, electrode motion, and muscle artifacts components with $a_1+a_2+a_3=1$, and $P_{bw,i}$, $P_{em,i}$, $P_{ma,i}$ are the normalized powers of baseline wandering, electrode motion, and muscle artifacts components on the i-th channel, respectively. The noise pattern of $x_i(t)$ can be represented in this context as $N_{Pat,i}=(a_1, a_2, a_3)$. Correspondingly, the probability of $x_i(t)$ with a noise pattern of $N_{i0}$, a signal-to-noise value of $L_{i0}$, and a rhythm type of Rio can be represented as:

$$P_{x_i}(N_{Pat,i}, L_{SNR,i}, R_i) = \frac{\text{card}\{x_i\colon N_{Pat,i} = N_{i0}, L_{SNR,i} = L_{i0}, R_i = R_{i0}\}}{N_{xi}} \tag{6}$$

where $N_{xi}$ is the total number of electrocardiogram recordings $x_i(t)$, card $\{x_i\colon N_{Pat,i}=N_{i0}, L_{SNR,i}=L_{i0}, R_i=R_{i0}\}$ is the total number of $x_i(t)$ with a noise or distortion pattern of $N_{i0}$, a signal-to-noise value of $L_{i0}$, and a rhythm type of $R_{i0}$.

Following the method for creating noise electrocardiogram recordings described above, a training set (e.g., training set 1200 of FIG. 12) is generated based on noise-free or clean electrocardiograms, which may be used to train, individually or collectively, the network (e.g., network 406, network 412, network 416). One or more testing set may be created from the training data as well and the one or more testing sets may be used to evaluate the performance of the proposed method. The training set 1200 may include distorted, corrupted, or noisy electrocardiogram signals or data. The electrocardiogram signals or data may include three equally likely noise or distortion patterns and twenty equally likely signal-to-noise values.

The first testing set (e.g., testing set 1210) may include five sets. In these sets, the signal-to-noise values of most noisy or distorted electrocardiogram signals or data are limited to a narrow range, and a noisy electrocardiogram signal or data may only contain one type of noise or distortion. This group of testing sets may simulate the noisy electrocardiogram signals recorded when the subjects are having activities at different intensity levels described herein (e.g., light activities 1.1, 1.2, 1.3 and vigorous activities 1.4, 1.5).

The second test set (e.g., test set 1220) may include about eight categories, each corresponding to one of the eight types of abnormal rhythms discussed herein. The noisy or distorted electrocardiogram signal or data in these test sets may have four equally probable noise patterns and each of the four patterns of noise contain the types of noise components discussed herein (e.g., baseline wandering, electrode motion, muscle artifacts). The noisy electrocardiogram signal or data may have ten equally probable signal-to-noise values, ranging from −27 dB to 12 dB.

In step 1104, pretrained models or weights may be transferred to one or more of the neural networks (e.g., network 406, network 412, network 416, network 432, etc.). In step 1106 the network (e.g., network 406, network 412, network 416, network 432, etc.) may be trained. The network (e.g., network 406, network 412, network 416, network 432, etc.) may be trained until a certain quantity of epochs or error rate is achieved. In step 1108, the quantity of epochs or error rate may be compared with a threshold or set point to determine if the network (e.g., network 406, network 412, network 416, network 432, etc.) is satisfactorily trained.

Figure 13:
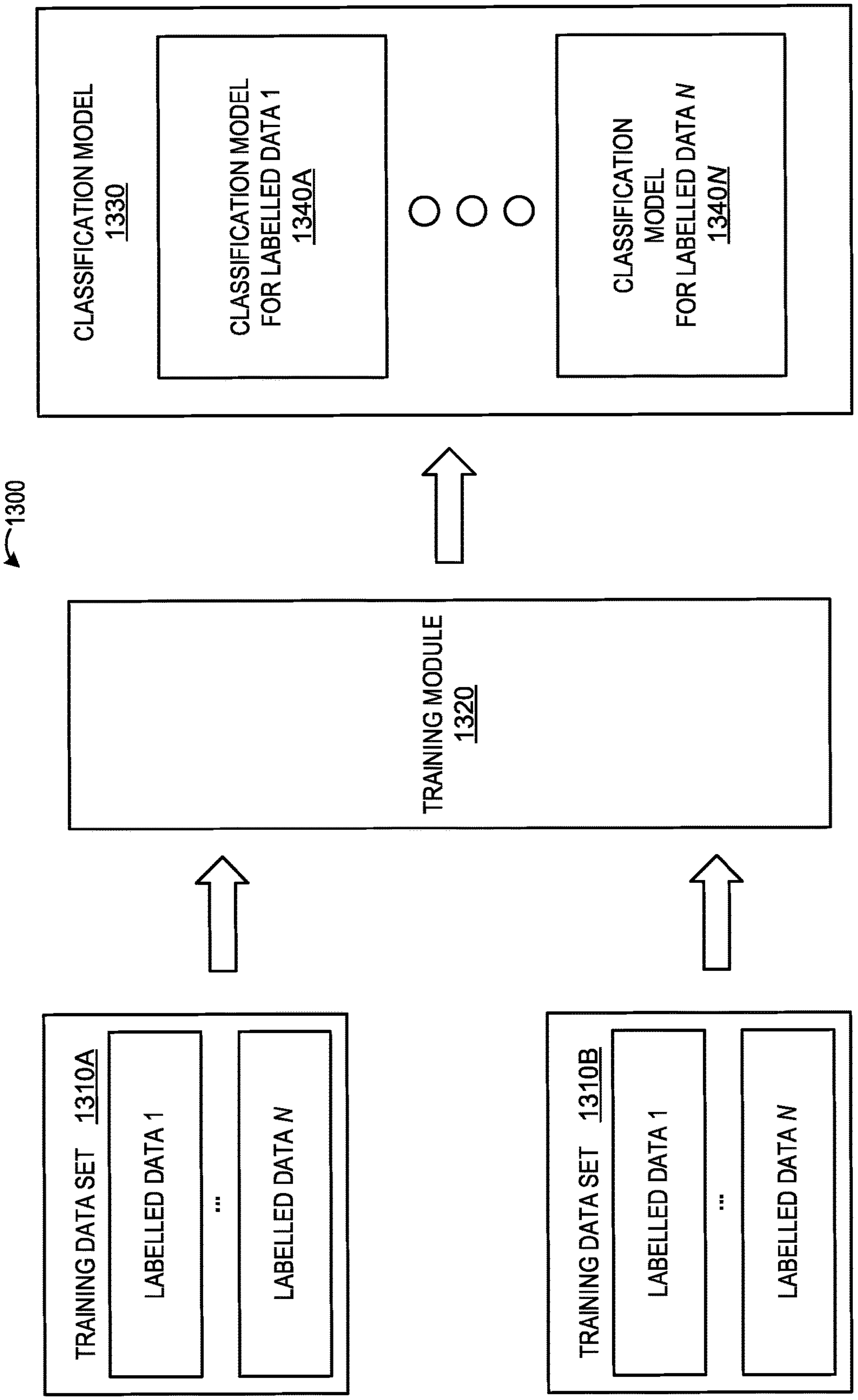
FIG. 13 illustrates an example system in accordance with one or more implementations of the present disclosure.

Turning now to FIG. 13, an example system 1300 for machine learning model training is shown. The system 1300 may be configured to use machine learning techniques to train, based on an analysis of a plurality of training datasets 1310A-1310B by a training module 1320, a classification model 1330. Functions of the system 1300 described herein may be performed, for example, by the computer 122, the cloud computing 302, and/or another computing device. The plurality of training datasets 1310A-1310B may be determined based on noise-free or clean electrocardiograms.

The training datasets 1310A, 1310B may be based on, or comprise, the data stored in database of the computing device 101 and/or the server 106. Such data may be randomly assigned to the training dataset 1310A, the training dataset 1310B, and/or to a testing dataset. In some implementations, assignment may not be completely random and one or more criteria or methods may be used during the assignment. For example, the training dataset 1310A and/or the training dataset 1310B may include distorted, corrupted, or noisy electrocardiogram signals or data. The electrocardiogram signals or data may include three equally likely noise or distortion patterns and twenty equally likely signal-to-noise values. The data may be randomly divided into training dataset and testing dataset. The first testing set may include five sets. In these sets, the signal-to-noise values of most noisy or distorted electrocardiogram signals or data are limited to a narrow range, and a noisy electrocardiogram signal or data may only contain one type of noise or distortion. The second test set may include about eight categories, each corresponding to one of the eight types of abnormal rhythms discussed herein. The noisy or distorted electrocardiogram signal or data in these test sets may have four equally probable noise patterns and each of the four patterns of noise contain the types of noise components discussed herein (e.g., baseline wandering, electrode motion, muscle artifacts).

The training module 1320 may train the classification model 1330 by determining/extracting the features from the training dataset 1310A and/or the training dataset 1310B in a variety of ways. For example, the training module 1320 may determine/extract a feature set from the training dataset 1310A and/or the training dataset 1310B. The training dataset 1310A and/or the training dataset 1310B may be analyzed to determine any dependencies, associations, and/or correlations between features in the training dataset 1310A and/or the training dataset 1310B. The identified correlations may have the form of a list of features that are associated with different labeled predictions. The term "feature," as used herein, may refer to any characteristic of an item of data that may be used to determine whether the item of data falls within one or more specific activities/categories or within a range. A feature selection technique may comprise one or more feature selection rules. The one or more feature selection rules may comprise a feature occurrence rule. The feature occurrence rule may comprise determining which features in the training dataset 1310A occur over a threshold number of times and identifying those features that satisfy the threshold as candidate features. For example, any features that appear greater than or equal to 5 times in the training dataset 1310A may be considered as candidate features. Any features appearing less than 5 times may be excluded from consideration as a feature. Other threshold numbers may be used as well.

A single feature selection rule may be applied to select features or multiple feature selection rules may be applied to select features. The feature selection rules may be applied in a cascading fashion, with the feature selection rules being applied in a specific order and applied to the results of the previous rule. For example, the feature occurrence rule may be applied to the training dataset 1310A to generate a first list of features. A final list of candidate features may be analyzed according to additional feature selection techniques to determine one or more candidate feature groups (e.g., groups of features that may be used to determine a prediction). Any suitable computational technique may be used to identify the candidate feature groups using any feature selection technique such as filter, wrapper, and/or embedded methods. One or more candidate feature groups may be selected according to a filter method. Filter methods include, for example, Pearson's correlation, linear discriminant analysis, analysis of variance (ANOVA), chi-square, combinations thereof, and the like. The selection of features according to filter methods are independent of any machine learning algorithms used by the system 1300. Instead, features may be selected on the basis of scores in various statistical tests for their correlation with the outcome variable (e.g., a prediction).

As another example, one or more candidate feature groups may be selected according to a wrapper method. A wrapper method may be configured to use a subset of features and train the prediction model 1330 using the subset of features. Based on the inferences that may be drawn from a previous model, features may be added and/or deleted from the subset. Wrapper methods include, for example, forward feature selection, backward feature elimination, recursive feature elimination, combinations thereof, and the like. For example, forward feature selection may be used to identify one or more candidate feature groups. Forward feature selection is an iterative method that begins with no features. In each iteration, the feature which best improves the model is added until an addition of a new variable does not improve the performance of the model. As another example, backward elimination may be used to identify one or more candidate feature groups. Backward elimination is an iterative method that begins with all features in the model. In each iteration, the least significant feature is removed until no improvement is observed on removal of features. Recursive feature elimination may be used to identify one or more candidate feature groups. Recursive feature elimination is a greedy optimization algorithm which aims to find the best performing feature subset. Recursive feature elimination repeatedly creates models and keeps aside the best or the worst performing feature at each iteration. Recursive feature elimination constructs the next model with the features remaining until all the features are exhausted. Recursive feature elimination then ranks the features based on the order of their elimination.

As a further example, one or more candidate feature groups may be selected according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to absolute value of the magnitude of coefficients and ridge regression performs L2 regularization which adds a penalty equivalent to square of the magnitude of coefficients.

After the training module 1320 has generated a feature set(s), the training module 1320 may generate the classification models 1340A-1340N based on the feature set(s). A machine learning-based classification model (e.g., any of the classification/prediction models 1340A-1340N) may refer to a complex mathematical model for the classification of one or more cardiac anomalies. The complex mathematical model for the classification of one or more cardiac anomalies may be generated using machine-learning techniques. By way of example, boundary features may be selected from, and/or represent the highest-ranked features in, a feature set. The training module 1320 may use the feature sets extracted from the training dataset 1310A and/or the training dataset 1310B to build the classification models 1340A-1340N for the classification of one or more activities. In some examples, the classification models 1340A-1340N may be combined into a single classification model 1340 (e.g., an ensemble model). Similarly, the classification model 1330 may represent a single model containing a single or a plurality of classification models 1340 and/or multiple models containing a single or a plurality of classification models 1340 (e.g., an ensemble model). It is noted that the training module 1320 may be part of a software module of the computing device (e.g., computer 122) and/or cardiac treatment and analysis software 1506 of the computing device 1501.

The extracted features (e.g., one or more candidate features) may be combined in the classification models 1340A-1340N that are trained using a machine learning approach such as discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting classification model 1330 may comprise a decision rule or a mapping for each candidate feature in order to assign a prediction to a class.

Figure 14:
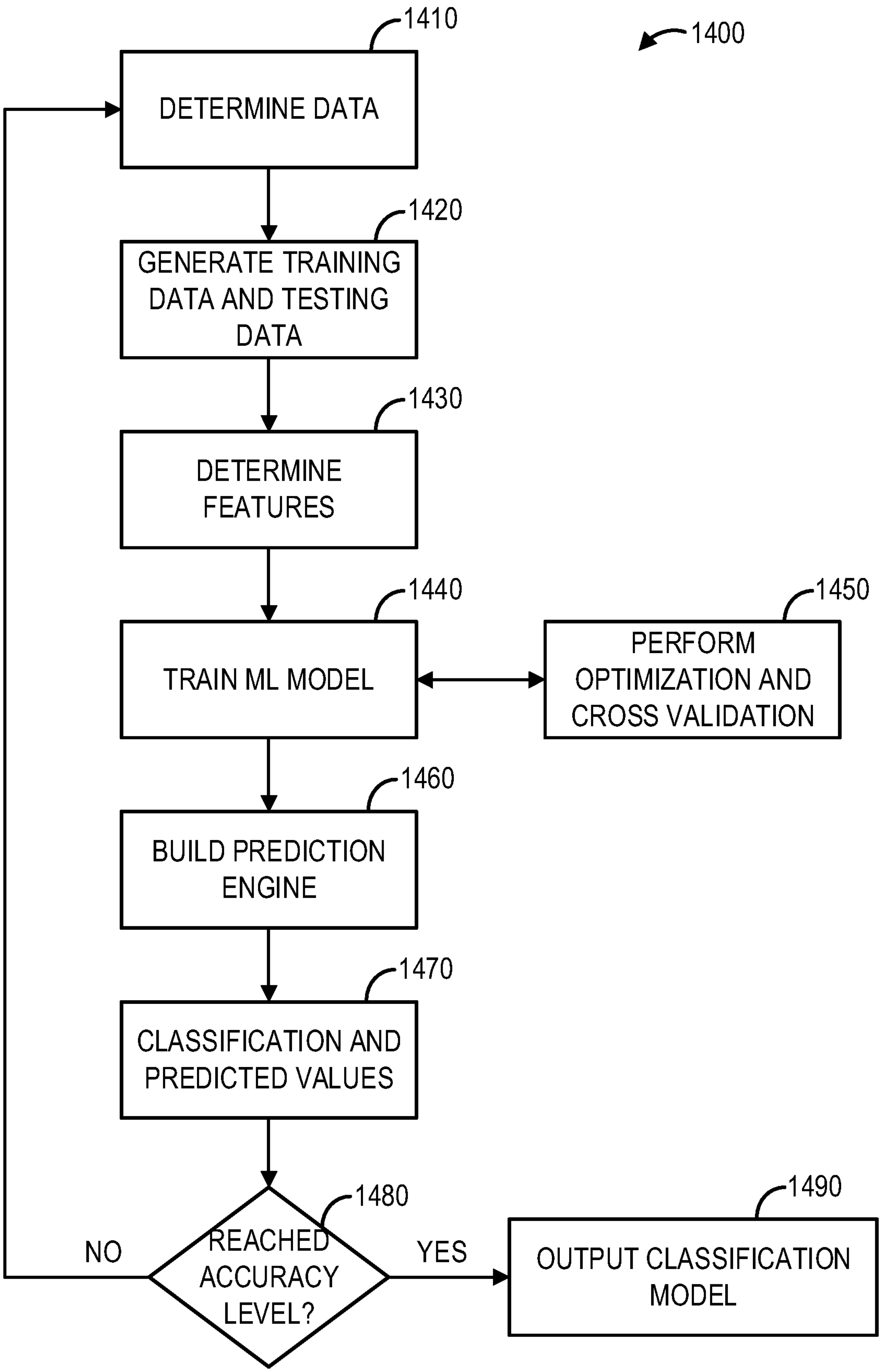
FIG. 14 illustrates an example method in accordance with one or more implementations of the present disclosure.

FIG. 14 is a flowchart illustrating an example training method 1400 for generating the classification model 1330 using the training module 1320. The training module 1320 may implement supervised, unsupervised, and/or semi-supervised (e.g., reinforcement based) learning. The method 1400 illustrated in FIG. 14 is an example of a supervised learning method; variations of this example of training method may be analogously implemented to train unsupervised and/or semi-supervised machine learning models. The method 1400 may be implemented by any of the devices shown in any of the systems 100, or 1500. For example, the method 1400 may be part of a software module of a computing device (e.g., computer 122) and/or cardiac treatment and analysis software 1506 of the computing device 1501.

At step 1410, the training method 1400 may determine (e.g., access, receive, retrieve, etc.) first training data and second training data (e.g., the training datasets 1310A-1310B). The first training data and the second training data may be determined based on noise-free or clean electrocardiograms. For example, the first training data and/or the second training data may include distorted, corrupted, or noisy electrocardiogram signals or data. The electrocardiogram signals or data may include three equally likely noise or distortion patterns and twenty equally likely signal-to-noise values. The data may be randomly divided into the first training data and the second training data. The training method 1400 may generate, at step 1420, a training dataset and a testing dataset. The training dataset and the testing dataset may be generated by randomly assigning data from the first training data and/or the second training data to either the training dataset or the testing dataset. The first testing set may include five sets. In these sets, the signal-to-noise values of most noisy or distorted electrocardiogram signals or data are limited to a narrow range, and a noisy electrocardiogram signal or data may only contain one type of noise or distortion. The second test set may include about eight categories, each corresponding to one of the eight types of abnormal rhythms discussed herein. The noisy or distorted electrocardiogram signal or data in these test sets may have four equally probable noise patterns and each of the four patterns of noise contain the types of noise components discussed herein (e.g., baseline wandering, electrode motion, muscle artifacts).

The training method 1400 may determine (e.g., extract, select, etc.), at step 1430, one or more features that may be used for, for example, classification of one or more cardiac anomalies. The one or more features may comprise a set of features. As an example, the training method 1400 may determine a set of features from the first training data. As another example, the training method 1400 may determine a set of features from the second training data. The training method 1400 may train one or more machine learning models (e.g., one or more classification models, one or more prediction models, neural networks, deep-learning models, etc.) using the one or more features at step 1440. In one example, the machine learning models may be trained using supervised learning. In another example, other machine learning techniques may be used, including unsupervised learning and semi-supervised. The machine learning models trained at step 1440 may be selected based on different criteria depending on the problem to be solved and/or data available in the training dataset. For example, machine learning models may suffer from different degrees of bias. Accordingly, more than one machine learning model may be trained at 1440, and then optimized, improved, and cross-validated at step 1450.

The training method 1400 may select one or more machine learning models to build the classification model 1330 at step 1460. The classification model 1330 may be evaluated using the testing dataset. The classification model 1330 may analyze the testing dataset and generate classification values (e.g., values indicating one or more activities) at step 1470. Classification values may be evaluated at step 1480 to determine whether such values have achieved a desired accuracy level. Performance of the classification model 1330 may be evaluated in a number of ways based on a number of true positives, false positives, true negatives, and/or false negatives classifications of the plurality of data points indicated by the classification model 1330. Related to these measurements are the concepts of recall and precision. Generally, recall refers to a ratio of true positives to a sum of true positives and false negatives, which quantifies a sensitivity of the classification/prediction model 1330. Similarly, precision refers to a ratio of true positives a sum of true and false positives. When such a desired accuracy level is reached, the training phase ends and the classification model 1330 may be output at step 1490; when the desired accuracy level is not reached, however, then a subsequent iteration of the training method 1400 may be performed starting at step 1410 with variations such as, for example, considering a larger collection of human activity data. The classification/prediction model 1330 may be output at step 1490.

Figure 15:
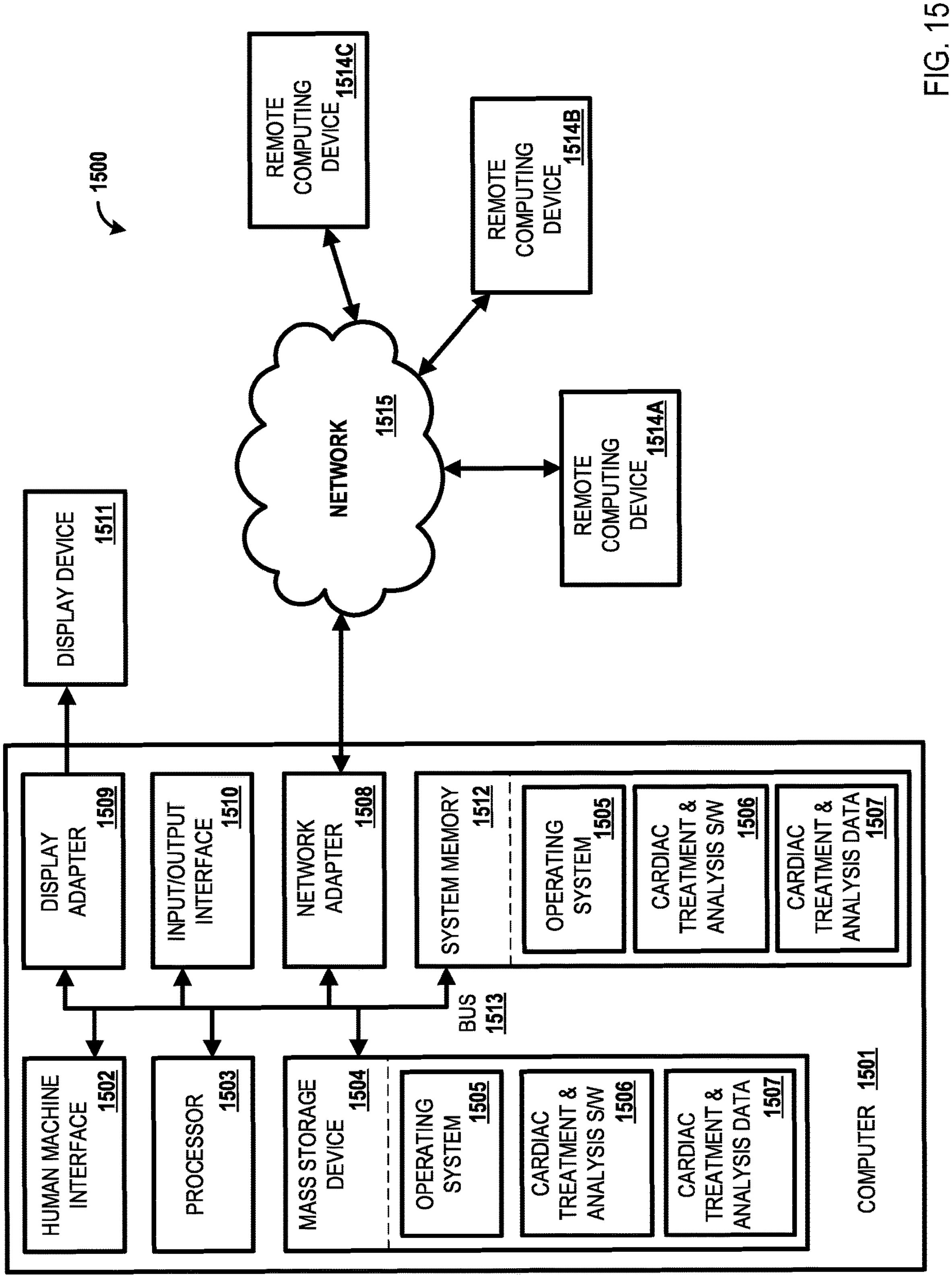
FIG. 15 shows an example computing device in accordance with one or more implementations of the present disclosure.

The methods described herein may be implemented on a computer 1501 as illustrated in FIG. 15 and described below. By way of example, the computer 122 and/or the computing system 120 of FIG. 1 and the cloud computing 302 of FIG. 3 may each be a computer 1501 as illustrated in FIG. 15. Similarly, the methods described herein may utilize one or more computers to perform one or more functions in one or more locations. FIG. 15 is a block diagram 1500 illustrating an operating environment for performing the described methods. This operating environment is only an example of an operating environment and is not intended to suggest any limitation as to the scope of use or functionality of operating environment architecture. Neither should the operating environment be interpreted as having any dependency or requirement relating to any one or combination of components illustrated in the operating environment.

The present methods for cardiac treatment and analysis may be operational with numerous other general purpose or special purpose computing system environments or configurations. Examples of well-known computing systems, environments, and/or configurations that may be suitable for use with the systems and methods may comprise, but are not limited to, network devices, personal computers, server computers, laptop devices, and multiprocessor systems. Additional examples may comprise programmable consumer electronics, network PCs, minicomputers, mainframe computers, distributed computing environments that comprise any of the above systems or devices, and the like.

The processing of the described methods may be performed by software components. The described systems and methods may be described in the general context of computer-executable instructions, such as program modules, being executed by one or more computers or other devices. Generally, program modules comprise computer code, routines, programs, objects, components, data structures, etc. that perform particular tasks or implement particular abstract data types. The described methods may also be practiced in grid-based and distributed computing environments where tasks are performed by remote processing devices that are linked through a communications network. In a distributed computing environment, program modules may be located in both local and remote computer storage media including memory storage devices.

Further, one skilled in the art will appreciate that the systems and methods described herein may be implemented via a general-purpose computing device in the form of a computer 1501. The components of the computer 1501 may comprise, but are not limited to, one or more processors or processing units 1503, a system memory 1512, and a system bus 1513 that couples various system components including the processing unit 1503 to the system memory 1512. In the case of multiple processing units 1503, the system may utilize parallel computing.

The system bus 1513 represents one or more of several possible types of bus structures, including a memory bus or memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI), a PCI-Express bus, a Personal Computer Memory Card Industry Association (PCMCIA), Universal Serial Bus (USB) and the like. The bus 1513, and all buses specified in this description may also be implemented over a wired or wireless network connection and each of the subsystems, including the processing unit 1503, a mass storage device 1504, an operating system 1505, cardiac treatment and analysis software 1506, cardiac treatment and analysis data 1507, a network adapter 1508, system memory 1512, an Input/Output Interface 1510, a display adapter 1509, a display device 1511, and a human-machine interface 1502, may be contained within one or more remote computing devices 1514A,B,C at physically separate locations, connected through buses of this form, in effect implementing a fully distributed system.

The computer 1501 typically comprises a variety of computer-readable media. Examples of computer-readable media may be any available media that is accessible by the computer 1501 and comprises, for example, both volatile and non-volatile media, removable and non-removable media. The system memory 1512 comprises computer-readable media in the form of volatile memory, such as random access memory (RAM), and/or non-volatile memory, such as read only memory (ROM). The system memory 1512 typically contains data such as cardiac treatment and analysis data 1507 and/or program modules such as operating system 1505 and cardiac treatment and analysis software 1506 that are immediately accessible to and/or are presently operated on by the processing unit 1503. The cardiac treatment and analysis software 1506 may perform the methods described in FIGS. 4-14.

In another aspect, the computer 1501 may also comprise other removable/non-removable, volatile/non-volatile computer storage media. By way of example, FIG. 15 illustrates a mass storage device 1504 which may provide non-volatile storage of computer code, computer-readable instructions, data structures, program modules, and other data for the computer 1501. For example, a mass storage device 1504 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 1504, including by way of example, an operating system 1505 and cardiac treatment and analysis software 1506. Each of the operating system 1505 and cardiac treatment and analysis software 1506 (or some combination thereof) may comprise elements of the programming and the cardiac treatment and analysis software 1506. Cardiac treatment and analysis data 1507 may also be stored on the mass storage device 1504. Cardiac treatment and analysis data 1507 may be stored in any of one or more databases known in the art. Examples of such databases may comprise, DB2®, Microsoft® Access, Microsoft® SQL Server, Oracle®, mySQL, PostgreSQL, Mongo DB, Riak, HBase, Cassandra, and the like. The databases may be centralized or distributed across multiple systems.

In another aspect, the user may enter commands and information into the computer 1501 via an input device (not shown). Examples of such input devices may comprise, but are not limited to, a keyboard, a pointing device (e.g., a "mouse"), a microphone, a joystick, a scanner, tactile input devices such as gloves, and other body coverings, and the like These and other input devices may be connected to the processing unit 1503 via a human-machine interface 1502 that is in communication with the system bus 1513, but may be connected by other interface and bus structures, such as a parallel port, game port, an IEEE 1394 Port (also known as a Firewire port), a serial port, or a universal serial bus (USB).

In yet another aspect, a display device 1511 may also be connected to the system bus 1513 via an interface, such as a display adapter 1509. It is contemplated that the computer 1501 may have more than one display adapter 1509 and the computer 1501 may have more than one display device 1511. By way of example, the display 124 may be the display device 1511 as illustrated in FIG. 15. For example, a display device 1511 may be a monitor, an LCD (Liquid Crystal Display), or a projector. In addition to the display device 1511, other output peripheral devices may comprise components such as speakers (not shown) and a printer (not shown) which may be connected to the computer 1501 via Input/Output Interface 1510. Any step and/or result of the methods may be output in any form to an output device. Such output may be any form of visual representation, including, but not limited to, textual, graphical, animation, audio, tactile, and the like. The display 1511 and computer 1501 may be part of one device, or separate devices.

The computer 1501 may operate in a networked environment using logical connections to one or more remote computing devices 1514A,B,C. By way of example, a remote computing device may be the equipment 104, the equipment 110, the controller 116 of FIG. 1. By way of example, a remote computing device may be a network device, personal computer, portable computer, smartphone, a server, a router, a network computer, a peer device or other common network node, and so on. Logical connections between the computer 1501 and a remote computing device 1514A,B,C may be made via a network 1515, such as a local area network (LAN) and/or a general wide area network (WAN). Such network connections may be through a network adapter 1508. A network adapter 1508 may be implemented in both wired and wireless environments. Such networking environments are conventional and commonplace in dwellings, offices, enterprise-wide computer networks, intranets, and the Internet.

For purposes of illustration, application programs and other executable program components such as the operating system 1505 are illustrated herein as discrete blocks, although it is recognized that such programs and components reside at various times in different storage components of the computer 1501, and are executed by the data processor(s) of the computer. An implementation of cardiac treatment and analysis software 1506 may be stored on or transmitted across some form of computer-readable media. Any of the described methods may be performed by computer-readable instructions embodied on computer-readable media. Computer-readable media may be any available media that may be accessed by a computer. By way of example and not meant to be limiting, computer-readable media may comprise "computer storage media" and "communications media." "Computer storage media" comprise volatile and non-volatile, removable and non-removable media implemented in any methods or technology for storage of information such as computer-readable instructions, data structures, program modules, or other data. Examples of computer storage media may comprise, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

The techniques disclosed herein may be implemented on a computing device in a way that improves the efficiency of its operation. As an example, the methods, instructions, and steps disclosed herein may improve the functioning of a computing device.

While the methods and systems have been described in connection with specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:

causing a head mounted visual display worn by a patient to output visual imagery configured to affect a psychological perception of the patient;

causing exercise equipment in use by the patient to affect a physical exercise performed by the patient for a cardiac stress test;

measuring, via one or more sensors, a cardiac exertion of the patient for the cardiac stress test;

determining, based on the cardiac exertion of the patient, that the patient has not reached a maximum cardiac exertion for the cardiac stress test; and adjusting the visual imagery, wherein the adjustment causes the patient to reach the maximum cardiac exertion for the cardiac stress test.

2. The method of claim 1, wherein adjusting the visual imagery further comprises:

increasing or decreasing a stress level of the visual imagery.

3. The method of claim 2, wherein the adjustment is determined based on regression analysis between an intensity level of the physical exercise and the stress level of the visual imagery.

4. The method of claim 2, wherein adjusting the stress level of the visual imagery comprises modifying one or more of a pace, complexity, or intensity of the visual imagery.

5. The method of claim 1, further comprising:

determining, based the adjustment, that the patient reached the maximum cardiac exertion; and determining, based on that the patient reached the maximum cardiac exertion, physiological data of the patient.

6. The method of claim 1, wherein the one or more sensors are one or more ECG sensors.

7. The method of claim 1, wherein the maximum cardiac exertion for the cardiac stress test is determined based on a target heart rate zone for the patient.

8. The method of claim 1, wherein the visual imagery comprises a virtual reality environment that responds to the physical exercise performed by the patient for the cardiac stress test.

9. The method of claim 1, further comprising:

receiving patient-specific data prior to the physical exercise for the cardiac stress test; and determining the maximum cardiac exertion for the cardiac stress test based on the patient-specific data.

10. The method of claim 1, wherein the head mounted visual display and the exercise equipment are synchronized such that the visual imagery corresponds to the physical exercise for the cardiac stress test.

11. A system comprising:

a head mount visual display configured to output visual imagery to affect a psychological perception of a patient;

exercise equipment configured to affect a physical exercise performed the patient;

one or more sensors configured to measure a cardiac exertion of the patient; and a controller configured to:

determine, based on the cardiac exertion of the patient, that the patient has not reached a maximum cardiac exertion for a cardiac stress test; and adjust the visual imagery, wherein the adjustment causes the patient to reach the maximum cardiac exertion for the cardiac stress test.

12. The system of claim 11, wherein the controller is further configured to:

determine, based on the adjustment, that the patient reached the maximum cardiac exertion; and determining, based on that the patient reached the maximum cardiac exertion, physiological data of the patient.

13. The system of claim 11, wherein the controller that is configured to adjust the visual imagery is further configured to:

increase or decrease a stress level of the visual imagery.

14. The system of claim 13, wherein the adjustment is determined based on regression analysis between an intensity level of the physical exercise and the stress level of the visual imagery.

15. The system of claim 13, wherein adjusting the stress level of the visual imagery comprises modifying one or more of a pace, complexity, or intensity of the visual imagery.

16. The system of claim 11, wherein the one or more sensors are one or more ECG sensors.

17. The system of claim 11, wherein the controller is further configured to synchronize the visual imagery output by the head mount visual display with the physical exercise performed on the exercise equipment for the cardiac stress test.

18. The system of claim 11, wherein the controller is further configured to receive patient-specific data and determine the maximum cardiac exertion for the cardiac stress test based on the patient-specific data.

19. The system of claim 11, wherein the head mount visual display is configured to output a virtual reality environment that responds to the physical exercise performed by the patient for the cardiac stress test.

20. A non-transitory computer-readable medium storing instructions that, when executed by a processor, cause the processor to:

cause a head mounted visual display worn by a patient to output visual imagery configured to affect a psychological perception of the patient;

cause exercise equipment in use by the patient to affect a physical exercise performed by the patient for a cardiac stress test;

receive, from one or more sensors, a measurement of a cardiac exertion of the patient for the cardiac stress test;

determine, based on the cardiac exertion of the patient, that the patient has not reached a maximum cardiac exertion for the cardiac stress test; and adjust the visual imagery, wherein the adjustment causes the patient to reach the maximum cardiac exertion for the cardiac stress test.

* * * * *